US010742538B2

(12) United States Patent
Sakoda et al.

(10) Patent No.: US 10,742,538 B2
(45) Date of Patent: Aug. 11, 2020

(54) INFORMATION PROCESSING APPARATUS AND INFORMATION PROCESSING METHOD

(71) Applicant: SONY CORPORATION, Tokyo (JP)

(72) Inventors: Kazuyuki Sakoda, Chiba (JP); Natsuki Itaya, Tokyo (JP); Erika Saito, Tokyo (JP)

(73) Assignee: SONY CORPORATION, Tokyo (JP)

( * ) Notice: Subject to any disclaimer, the term of this patent is extended or adjusted under 35 U.S.C. 154(b) by 81 days.

(21) Appl. No.: 15/523,364

(22) PCT Filed: Nov. 4, 2015

(86) PCT No.: PCT/JP2015/005522
§ 371 (c)(1),
(2) Date: Apr. 28, 2017

(87) PCT Pub. No.: WO2016/079940
PCT Pub. Date: May 26, 2016

(65) Prior Publication Data
US 2017/0250898 A1 Aug. 31, 2017

(30) Foreign Application Priority Data

Nov. 17, 2014 (JP) .................................. 2014-232692

(51) Int. Cl.
*H04L 12/721* (2013.01)
*H04L 12/761* (2013.01)
(Continued)

(52) U.S. Cl.
CPC .......... *H04L 45/123* (2013.01); *H04L 45/122* (2013.01); *H04L 45/16* (2013.01);
(Continued)

(58) Field of Classification Search
None
See application file for complete search history.

(56) References Cited

U.S. PATENT DOCUMENTS 7,649,884 B1 1/2010 Ahmed et al.
2006/0083261 A1* 4/2006 Maeda ................ H04L 12/5692
370/465
(Continued)

FOREIGN PATENT DOCUMENTS

JP 2007-068233 A 3/2007
JP 2008-533809 A 8/2008
(Continued)

OTHER PUBLICATIONS

Ramalakshmi, et al., "Weighted dominating set based routing for ad hoc communications in emergency and rescue scenarios", Wireless Netw (2015) 21:499-512, DOI 10.1007/s11276-014-0800-4, Sep. 4, 2014, 14 pages.

(Continued)

*Primary Examiner* — Rebecca E Song
(74) *Attorney, Agent, or Firm* — Chip Law Group

(57) ABSTRACT

An information processing apparatus in a mesh network, includes circuitry that, when the information processing apparatus is allocated as a root node for multicast transmission, transmits path request for multicast to other information processing apparatuses in the mesh network. The circuitry also determines a path for multicast based on responses received from the other information processing apparatuses, and performs multicast transmission of data via the determined path for multicast.

13 Claims, 27 Drawing Sheets

(51) Int. Cl.
*H04W 40/00* (2009.01)
*H04L 12/733* (2013.01)
*H04W 40/02* (2009.01)
*H04W 40/32* (2009.01)
*H04W 84/12* (2009.01)
*H04W 84/18* (2009.01)

(52) U.S. Cl.
CPC .......... *H04W 40/00* (2013.01); *H04W 40/02* (2013.01); *H04W 40/32* (2013.01); *H04W 84/12* (2013.01); *H04W 84/18* (2013.01)

(56) References Cited

U.S. PATENT DOCUMENTS

| | | | | |
|---|---|---|---|---|
| 2008/0181133 | A1* | 7/2008 | Thubert | H04W 40/30 370/255 |
| 2009/0010190 | A1* | 1/2009 | Gong | H04L 45/26 370/311 |
| 2010/0074194 | A1 | 3/2010 | Liu et al. | |
| 2014/0003295 | A1* | 1/2014 | Gossain | H04L 12/2838 370/256 |
| 2015/0156815 | A1* | 6/2015 | Pang | H04W 84/12 370/338 |

FOREIGN PATENT DOCUMENTS

| | | |
|---|---|---|
| JP | 2008-541505 A | 11/2008 |
| JP | 2009-206650 A | 9/2009 |
| JP | 2009-273140 A | 11/2009 |
| JP | 2014-068202 A | 4/2014 |
| JP | 2014-068203 A | 4/2014 |

OTHER PUBLICATIONS

Office Action for JP Patent Application No. 2014-232692, dated Sep. 5, 2017, 05 pages of Office Action and 03 pages of English Translation.

Ramalakshmi, et al., "Weighted Dominating Set Based Routing for Ad hoc Communications in Emergency and Rescue Scenarios", Wireless Networks, vol. 21, Sep. 4, 2014, pp. 499-512.

Office Action for JP Patent Application No. 2014-232692, dated Feb. 13, 2018, 03 pages of Office Action and 03 pages of English Translation.

Office Action for EP Patent Application No. 15797715.8, dated Jun. 29, 2018, 08 pages of Office Action.

Ramalakshmi, et al., "Weighted dominating Set Based Routing for Ad Hoc Communications in Emergency and Rescue Scenarios", Wireless Netw(2015), DOI 10.1007/s11276-014-0800-4, Sep. 4, 2014, pp. 499-512.

Office Action for JP Patent Application No. 2014-232692, dated Dec. 5, 2017, 05 pages of Office Action.

Office Action for CN Patent Application No. 201580061508.5, dated Feb. 6, 2020, 07 pages of Office Action and 12 pages of English Translation.

* cited by examiner

DATA(D=A, S=0, T=0)

DATA(D=A, S=0, T=2)

DATA(D=A, S=0, T=1)

DATA(D=A, S=0, T=3)

FIG. 6

| | | |
|---|---|---|
| 230 | Length | LENGTH OF PAYLOAD. |
| 231 | Action Type | IDENTIFIER REPRESENTING THAT SIGNAL IS PREQ IS STORED. RECEIVER CAN RECOGNIZE THAT SIGNAL IS PREQ BY REFERRING TO THIS FIELD. |
| 232 | Flags | ATTRIBUTE OF PREQ IS STORED. |
| 233 | OrigSTA | IDENTIFIER REPRESENTING INFORMATION PROCESSING APPARATUS (TRANSMISSION SOURCE STATION) THAT IS SOURCE REQUESTING TO GENERATE MESH PATH IS STORED. PREQ IS TRANSMITTED TO REMOTE PLACE USING MULTI-HOP RELAY, AND INFORMATION PROCESSING APPARATUS THAT IS TRANSMISSION SOURCE STATION CAN BE RECOGNIZED. |
| 234 | DestSTA | IDENTIFIER REPRESENTING INFORMATION PROCESSING APPARATUS (DESTINATION STATION) THAT IS DESTINATION REQUESTED TO GENERATE MESH PATH IS STORED. WHEN PREQ IS RECEIVED, INFORMATION PROCESSING APPARATUS SPECIFIED BY IDENTIFIER RETURNS PREP BY RESPONDING THERETO. ACCORDINGLY, BI-DIRECTIONAL MESH PATH IS GENERATED. |
| 235 | SeqNum | IDENTIFIER USED FOR IDENTIFYING PREQ IS STORED. WHILE PREQ IS TRANSMITTED FROM TRANSMISSION SOURCE STATION PLURALITY OF NUMBER OF TIMES, EACH PREQ CAN BE IDENTIFIED BASED ON INCREMENT OF SeqNum THAT IS MADE FOR EACH TIME. |
| 236 | HopCount | NUMERICAL VALUE REPRESENTING NUMBER OF HOPS THROUGH WHICH PREQ ARRIVES FROM TRANSMISSION SOURCE STATION IS STORED. WHILE INFORMATION PROCESSING APPARATUS THAT HAS RECEIVED PREQ EXECUTES MULTI-HOP TRANSMISSION THEREOF, VALUE INCREMENTED FOR EACH TRANSMISSION PROCESS IS STORED. |
| 237 | Metric | VALUE REPRESENTING METRIC VALUE NECESSARY FOR ARRIVAL FROM TRANSMISSION SOURCE STATION OF PREQ IS STORED. INFORMATION PROCESSING APPARATUS RECEIVING PREQ EXECUTES MULTI-HOP TRANSMISSION THEREOF, AND VALUE ACQUIRED BY ACCUMULATIVELY ADDING METRIC VALUE OF LINK THAT IS INCREMENTED FOR EACH TRANSMISSION PROCESS IS STORED. |
| 238 | Lifetime | WHEN MESH PATH GENERATION REQUEST IS SUCCESSFUL, ACTIVE MESH PATH IS GENERATED, AND ACCORDINGLY, INFORMATION FOR DESIGNATING VALID PERIOD OF MESH PATH IS STORED. |
| 239 | Etc | OTHER MANAGEMENT INFORMATION |

FIG. 7

| | | |
|---|---|---|
| 240 | Length | LENGTH OF PAYLOAD. |
| 241 | Action Type | IDENTIFIER REPRESENTING THAT SIGNAL IS PREP IS STORED. RECEIVER CAN RECOGNIZE THAT SIGNAL IS PREP BY REFERRING TO THIS FIELD. |
| 242 | Flags | ATTRIBUTE OF TRANSMISSION SOURCE OF PREP IS STORED. |
| 243 | OrigSTA | IDENTIFIER REPRESENTING INFORMATION PROCESSING APPARATUS THAT IS SOURCE REQUESTING TO GENERATE MESH PATH IS STORED. IDENTIFIER OF INFORMATION PROCESSING APPARATUS STORED IN OrigSTA OF PREQ IS TRANSFERRED. |
| 244 | DestSTA | IDENTIFIER REPRESENTING INFORMATION PROCESSING APPARATUS THAT IS DESTINATION REQUESTED TO GENERATE MESH PATH IS STORED. IDENTIFIER OF INFORMATION PROCESSING APPARATUS STORED IN DestSTA OF PREQ IS TRANSFERRED. |
| 245 | SeqNum | IDENTIFIER USED FOR IDENTIFYING PREP IS STORED. WHILE PREP IS TRANSMITTED FROM TRANSMISSION SOURCE STATION PLURALITY OF NUMBER OF TIMES, EACH PREP CAN BE IDENTIFIED BASED ON INCREMENT OF SeqNum THAT IS MADE FOR EACH TIME. |
| 246 | HopCount | NUMERICAL VALUE REPRESENTING NUMBER OF HOPS THROUGH WHICH PREP ARRIVES FROM TRANSMISSION SOURCE STATION IS STORED. WHILE INFORMATION PROCESSING APPARATUS THAT HAS RECEIVED PREP EXECUTES MULTI-HOP TRANSMISSION THEREOF, VALUE INCREMENTED FOR EACH TRANSMISSION PROCESS IS STORED. |
| 247 | Metric | VALUE REPRESENTING METRIC VALUE NECESSARY FOR ARRIVAL FROM TRANSMISSION SOURCE STATION OF PREP IS STORED. INFORMATION PROCESSING APPARATUS RECEIVING PREP EXECUTES MULTI-HOP TRANSMISSION THEREOF, AND VALUE ACQUIRED BY ACCUMULATIVELY ADDING METRIC VALUE OF LINK THAT IS INCREMENTED FOR EACH TRANSMISSION PROCESS IS STORED. |
| 248 | Lifetime | WHEN MESH PATH GENERATION REQUEST IS SUCCESSFUL, ACTIVE MESH PATH IS GENERATED, AND ACCORDINGLY, INFORMATION FOR DESIGNATING VALID PERIOD OF MESH PATH IS STORED. |
| 249 | Etc | OTHER MANAGEMENT INFORMATION |

| | Dest | XXX |
|---|---|---|
| a | NextHop | YYY |
| b | Metric | 999 |
| c | SeqNum | 111 |
| d | ExpTime (Lifetime) | 222 |

251 — Dest row
252 — a
253 — b
254 — c
255 — d

FIG. 8B

| Index (256) | DATA NAME (257) | MEANING (258) |
|---|---|---|
| a | NextHop | IDENTIFIER OF INFORMATION PROCESSING APPARATUS USED FOR SPECIFYING INFORMATION PROCESSING APPARATUS FOR NEXT TRANSMISSION SO AS TO ALLOW DATA TO ARRIVE AT DESTINATION STATION |
| b | Metric | PATH METRIC VALUE FROM CURRENT STATION TO DESTINATION STATION OF MESH PATH |
| c | SeqNum | PREQ OR SeqNum VALUE OF PREP USED FOR GENERATION OF MESH PATH |
| d | ExpTime (Lifetime) | VALID PERIOD OF MESH PATH IT IS DETERMINED BASED ON PREQ OR Lifetime OF PREP USED FOR GENERATION OF MESH PATH |

PREQ(D=A, O=0, T=0)

PREQ(D=A, O=0, T=1)

PREP(D=2, O=0, T=2)

PREP(D=1, O=0, T=1)

PREP(D=3, O=0, T=3)

PREP(D=3, O=0, T=1)

FIG. 11A

| | | |
|---|---|---|
| 251 | Dest | XXX |
| 252 a | NextHop | YYY |
| 253 b | Metric | 999 |
| 254 c | SeqNum | 111 |
| 255 d | ExpTime (Lifetime) | 222 |
| 301 e | RootFlag | 0 |
| 302 f | Link_metric | 333 |
| 303 g | ProactivePath | 0 |

FIG. 11B

| Index | DATA NAME | MEANING |
|---|---|---|
| 252 a | NextHop | IDENTIFIER OF INFORMATION PROCESSING APPARATUS USED FOR SPECIFYING INFORMATION PROCESSING APPARATUS FOR NEXT TRANSMISSION SO AS TO ALLOW DATA TO ARRIVE AT DESTINATION STATION |
| 253 b | Metric | PATH METRIC VALUE FROM CURRENT STATION TO DESTINATION STATION OF MESH PATH |
| 254 c | SeqNum | PREQ OR SeqNum VALUE OF PREP USED FOR GENERATION OF MESH PATH |
| 255 d | ExpTime (Lifetime) | VALID PERIOD OF MESH PATH IT IS DETERMINED BASED ON PREQ OR Lifetime OF PREP USED FOR GENERATION OF MESH PATH |
| 301 e | RootFlag | FLAG REPRESENTING THAT MESH PATH MAINTAINS PATH ADDRESSED TO ROOT STATION (FLAG REPRESENTING THAT MESH PATH IS GENERATED ACCORDING TO RECEPTION OF PREQ) |
| 302 f | Link_metric | METRIC VALUE OF MESH PATH UP TO Nexthop (METRIC CORRESPONDING TO ONE LINK IS REFERRED TO AS LINK METRIC) |
| 303 g | ProactivePath | FLAG REPRESENTING THAT MESH PATH MAINTAINS PATH ADDRESSED TO MEMBER STATION (FLAG REPRESENTING THAT MESH PATH IS GENERATED ACCORDING TO RECEPTION OF PREP) |

PREQ(D=A, O=0, T=0)

PREQ(D=A, O=0, T=1)

PREP(D=2, O=0, T=2)

PREP(D=A, O=0, T=3)

PREP(D=A, O=0, T=1)

FIG. 14A

| 251 | Dest | Addr-A |
|---|---|---|
| 252 | a | NextHop | 1 |
| 253 | b | Metric | — |
| 254 | c | SeqNum | 111 |
| 255 | d | ExpTime (Lifetime) | 222 |
| 301 | e | RootFlag | 0 |
| 302 | f | Link_metric | — |
| 303 | g | ProactivePath | 1 |

| 251 | Dest | Addr-A |
|---|---|---|
| 252 | a | NextHop | 2 |
| 253 | b | Metric | — |
| 254 | c | SeqNum | 111 |
| 255 | d | ExpTime (Lifetime) | 222 |
| 301 | e | RootFlag | 0 |
| 302 | f | Link_metric | — |
| 303 | g | ProactivePath | 1 |

FIG. 14B

| 251 | Dest | Addr-A |
|---|---|---|
| 252 | a | NextHop | 0 |
| 253 | b | Metric | 200 |
| 254 | c | SeqNum | 111 |
| 255 | d | ExpTime (Lifetime) | 222 |
| 301 | e | RootFlag | 1 |
| 302 | f | Link_metric | 200 |
| 303 | g | ProactivePath | 0 |

| 251 | Dest | Addr-A |
|---|---|---|
| 252 | a | NextHop | 3 |
| 253 | b | Metric | — |
| 254 | c | SeqNum | 111 |
| 255 | d | ExpTime (Lifetime) | 222 |
| 301 | e | RootFlag | 0 |
| 302 | f | Link_metric | — |
| 303 | g | ProactivePath | 1 |

FIG. 15A

| | Dest | Addr-A |
|---|---|---|
| a | NextHop | 0 |
| b | Metric | 300 |
| c | SeqNum | 111 |
| d | ExpTime (Lifetime) | 222 |
| e | RootFlag | 1 |
| f | Link_metric | 300 |
| g | ProactivePath | 0 |

FIG. 15B

| | Dest | Addr-A |
|---|---|---|
| a | NextHop | 1 |
| b | Metric | 420 |
| c | SeqNum | 111 |
| d | ExpTime (Lifetime) | 222 |
| e | RootFlag | 1 |
| f | Link_metric | 220 |
| g | ProactivePath | 0 |

PREP(D=2, O=0, T=2)

FIG. 23A

| | Dest | Addr-A |
|---|---|---|
| 251 → | | |
| 252 → a | NextHop | 1 |
| 253 → b | Metric | — |
| 254 → c | SeqNum | 111 |
| 255 → d | ExpTime (Lifetime) | 222 |
| 301 → e | RootFlag | 0 |
| 302 → f | Link_metric | — |
| 303 → g | ProactivePath | 1 |

FIG. 23B

| | Dest | Addr-A |
|---|---|---|
| 251 → | | |
| 252 → a | NextHop | 0 |
| 253 → b | Metric | 200 |
| 254 → c | SeqNum | 111 |
| 255 → d | ExpTime (Lifetime) | 222 |
| 301 → e | RootFlag | 1 |
| 302 → f | Link_metric | 200 |
| 303 → g | ProactivePath | 0 |

| | Dest | Addr-A |
|---|---|---|
| 251 → | | |
| 252 → a | NextHop | 2 |
| 253 → b | Metric | - |
| 254 → c | SeqNum | 111 |
| 255 → d | ExpTime (Lifetime) | 222 |
| 301 → e | RootFlag | 0 |
| 302 → f | Link_metric | - |
| 303 → g | ProactivePath | 1 |

| | Dest | Addr-A |
|---|---|---|
| 251 → | | |
| 252 → a | NextHop | 3 |
| 253 → b | Metric | - |
| 254 → c | SeqNum | 111 |
| 255 → d | ExpTime (Lifetime) | 222 |
| 301 → e | RootFlag | 0 |
| 302 → f | Link_metric | - |
| 303 → g | ProactivePath | 1 |

FIG. 24A

| | Dest | Addr-A |
|---|---|---|
| 251 | | |
| 252 — a | NextHop | 1 |
| 253 — b | Metric | 300 |
| 254 — c | SeqNum | 111 |
| 255 — d | ExpTime (Lifetime) | 222 |
| 301 — e | RootFlag | 1 |
| 302 — f | Link_metric | 210 |
| 303 — g | ProactivePath | 0 |

FIG. 24B

| | Dest | Addr-A |
|---|---|---|
| 251 | | |
| 252 — a | NextHop | 1 |
| 253 — b | Metric | 420 |
| 254 — c | SeqNum | 111 |
| 255 — d | ExpTime (Lifetime) | 222 |
| 301 — e | RootFlag | 1 |
| 302 — f | Link_metric | 220 |
| 303 — g | ProactivePath | 0 |

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2015/005522 filed on Nov. 4, 2015, which claims priority benefit of Japanese Patent Application No. JP 2014-232692 filed in the Japan Patent Office on Nov. 17, 2014. Each of the above-referenced applications is hereby incorporated herein by reference in its entirety.

TECHNICAL FIELD

The present technology relates to an information processing apparatus. Described in more detail, the present technology relates to an information processing apparatus and an information processing method handling information relating to radio communication and a program causing a computer to execute the method.

BACKGROUND ART

In related art, there are radio communication technologies for exchanging various kinds of data through radio communication. For example, a communication method (for example, ad hoc communication or an ad hoc network) autonomously making a connection with an information processing apparatus present on the periphery thereof has been proposed.

In addition, technologies for generating a multicast mesh path within a network and executing multicast transmission have been proposed. For example, a radio mesh network system exchanging a frame used for generating multicast through unicast transmission has been proposed (for example, Patent Literatures 1 and 2).

CITATION LIST

Patent Literature

[PTL 1]
JP 2014-68202 A
[PTL 2]
JP 2014-68203 A

SUMMARY

Technical Problem

In the related art described above, nodes are classified into control nodes and multicast nodes, and multicast transmission is exchanged.

Here, depending on the use environments of each information processing apparatus, a case may be considered in which the role of each information processing apparatus is changed. For example, a case may be also considered in which an information processing apparatus executing multicast transmission is used as an information processing apparatus receiving information transmitted through multicast. For this reason, it is important to appropriately execute multicast transmission by exchanging the multicast transmission with information processing apparatuses being in a flat relation in a network in which a connection with information processing apparatuses present on the periphery is autonomously executed.

The present technology is in consideration of such situations, and it is preferable to appropriately execute multicast transmission.

Solution to Problem

The present technology is for solving the above-described problems, and, according to a first aspect, there are provided an information processing apparatus including a control unit that executes control of transmitting a path request signal requesting to generate a multicast transmission path to a plurality of information processing apparatuses in a case where the information processing apparatus is set as an information processing apparatus transmitting a content through multicast to the other information processing apparatuses that configure a network in which the plurality of information processing apparatuses are interconnected by one-to-one radio communication executed by the plurality of information processing apparatuses, an information processing method thereof, and a program causing a computer to execute the method. Accordingly, an operation of transmitting a path request signal requesting to generate a multicast transmission path to a plurality of information processing apparatuses is acquired in a case where the information processing apparatus is set as an information processing apparatus executing multicast transmission.

In addition, in the first aspect, the control unit may transmit the path request signal with a destination address of the path request signal being set as a multicast address. In such a case, an operation of transmitting a path request signal with a destination address of the path request signal being set as a multicast address is acquired.

In addition, in the first aspect, the control unit may generate path information used for the multicast transmission based on a path response signal in a case where the path response signal corresponding to the path request signal is received. In such a case, an operation of generating path information used for the multicast transmission based on a path response signal is acquired in a case where the path response signal corresponding to the path request signal is received.

In addition, in the first aspect, the control unit may transmit the content through unicast to a neighboring information processing apparatus specified by the path information in a case where the content is transmitted to the plurality of information processing apparatuses through multicast. In such a case, an operation of transmitting the content through unicast to a neighboring information processing apparatus specified by the path information is acquired in a case where the content is transmitted to the plurality of information processing apparatuses through multicast.

In addition, according to a second aspect of the present technology, there are provided an information processing apparatus including: a communication unit that receives a path request signal requesting to generate a multicast transmission path from a first information processing apparatus transmitting a content through multicast that is another information processing apparatus configuring a network in which a plurality of information processing apparatuses are interconnected by one-to-one radio communication executed by the plurality of information processing apparatuses; and a control unit that maintains path information relating to a communication path specified by the path request signal as a path information candidate of the multicast transmission and determines the path information candidate as the path information of the multicast transmission at timing when a path response signal used for responding to the path request signal is transmitted, an information processing method thereof, and a program causing a computer to execute the method. In such a case, when a path request signal requesting to generate a multicast transmission path is received, an operation of maintaining path information relating to a communication path specified by the path request signal as a path information candidate of the multicast transmission and determining the path information candidate as the path information of the multicast transmission at timing when a path response signal used for responding to the path request signal is transmitted is acquired.

In addition, in the second aspect, the first information processing apparatus may transmit the content through multicast to information processing apparatuses belonging to a predetermined group among the plurality of information processing apparatuses, and the control unit may transmit the path response signal in a case where a destination address of the path request signal is a multicast address, and the information processing apparatus belongs to a group specified by the multicast address. In such a case, an operation of transmitting the path response signal is acquired in a case where a destination address of the path request signal is a multicast address, and the information processing apparatus belongs to a group specified by the multicast address.

In addition, in the second aspect, the control unit may generate the path information designating the information processing apparatus transmitting the path response signal as a transmission destination information processing apparatus used for transmitting the content through multicast. In such a case, an operation of generating the path information designating the information processing apparatus transmitting the path response signal as a transmission destination information processing apparatus used for transmitting the content through multicast is acquired.

In addition, in the second aspect, the control unit may set a valid period of the path information based on valid period information designated by the path request signal. In such a case, an operation of setting a valid period of the path information based on valid period information designated by the path request signal is acquired.

In addition, in the second aspect, in a case where the path request signal is received, the control unit may transmit the path request signal through unicast transmission to a neighboring information processing apparatus specified by the determined path information. In such a case, in a case where the path request signal is received, an operation of transmitting the path request signal through unicast transmission to a neighboring information processing apparatus specified by the determined path information is acquired.

In addition, in the second aspect, in a case where the path request signal is received, the control unit may execute a determination for transmitting the path request signal to the other information processing apparatuses and a determination for maintaining the path information relating to a communication path specified by the path request signal as the path information candidate based on mutually-different criteria. In such a case, in a case where the path request signal is received, an operation of executing a determination for transmitting the path request signal to the other information processing apparatuses and a determination for maintaining the path information relating to a communication path specified by the path request signal as the path information candidate based on mutually-different criteria is acquired.

In addition, in the second aspect, the control unit may execute the determination for maintaining the path information candidate based on a result of comparison between a metric value included in the path request signal, a link metric value up to the information processing apparatus transmitting the path request signal, a metric value maintained as the path information candidate, and a link metric value up to a neighboring information processing apparatus specified by the path information candidate. In such a case, an operation of executing the determination for maintaining the path information candidate based on a result of comparison between a metric value included in the path request signal, a link metric value up to the information processing apparatus transmitting the path request signal, a metric value maintained as the path information candidate, and a link metric value up to a neighboring information processing apparatus specified by the path information candidate is acquired.

In a third aspect, an information processing apparatus in a mesh network includes circuitry that, when the information processing apparatus is allocated as a root node for multicast transmission, transmits a path request for multicast to other information processing apparatuses in the mesh network. The circuitry also determines a path for multicast based on responses received from the other information processing apparatuses, and performs multicast transmission of data via the determined path for multicast.

In a fourth aspect, an information processing method for an information processing apparatus in a mesh network includes, when the information processing apparatus is allocated as a root node for multicast transmission, transmitting, with circuitry, a path request for multicast to other information processing apparatuses in the mesh network; determining, with the circuitry, a path for multicast based on responses received from the other information processing apparatuses; and performing, with the circuitry, multicast transmission of data via the determined path for multicast.

In a fifth aspect, a non-transitory computer-readable medium encoded with computer-readable instructions thereon that, when executed by an information processing apparatus in a mesh network, cause the information processing apparatus to perform a method that includes, when the information processing apparatus is allocated as a root node for multicast transmission, transmitting a path request for multicast to other information processing apparatuses in the mesh network; determining a path for multicast based on responses received from the other information processing apparatuses; and performing multicast transmission of data via the determined path for multicast.

Advantageous Effects of Invention

According to the present technology, a superior advantage of appropriately executing multicast transmission is acquired. The advantages described here are not necessarily limited, and any one of the advantages described in the present disclosure may be achieved.

BRIEF DESCRIPTION OF DRAWINGS

FIG. 6 is a diagram that illustrates an example of the content of the signal format of a management packet that is exchanged between information processing apparatuses configuring the communication system 10 according to an embodiment of the present technology.

FIG. 7 is a diagram that illustrates an example of the content of the signal format of a management packet that is exchanged between information processing apparatuses configuring the communication system 10 according to an embodiment of the present technology.

FIGS. 8A and 8B are diagrams that schematically illustrate an example (mesh path table 250) of a mesh path table that is maintained by each information processing apparatus configuring the communication system 10 according to an embodiment of the present technology.

FIGS. 11A and 11B are diagrams that schematically illustrate an example (mesh path table 300) of a mesh path table that is maintained by each information processing apparatus configuring the communication system 10 according to an embodiment of the present technology.

FIGS. 14A and 14B are diagrams that schematically illustrate an example of a mesh path table that is generated by each information processing apparatus configuring the communication system 10 according to an embodiment of the present technology.

FIGS. 15A and 15B are diagrams that schematically illustrate an example of a mesh path table that is generated by each information processing apparatus configuring the communication system 10 according to an embodiment of the present technology.

FIGS. 23A and 23B is a diagram that schematically illustrates an example of a mesh path table generated by each information processing apparatus configuring the communication system 10 according to an embodiment of the present technology.

FIGS. 24A and 24B is a diagram that schematically illustrates an example of a mesh path table that is generated by each information processing apparatus configuring the communication system 10 according to an embodiment of the present technology.

DESCRIPTION OF EMBODIMENTS

Hereinafter, embodiments of the present technology (hereinafter, referred to as embodiments) will be described. Description will be presented in the following order.

1. Embodiment (Example of Execution of Multicast Transmission by Generating Multicast Mesh Path)

2. Application Example

1. Embodiment

[Configuration Example of Communication System]

Figure 1:
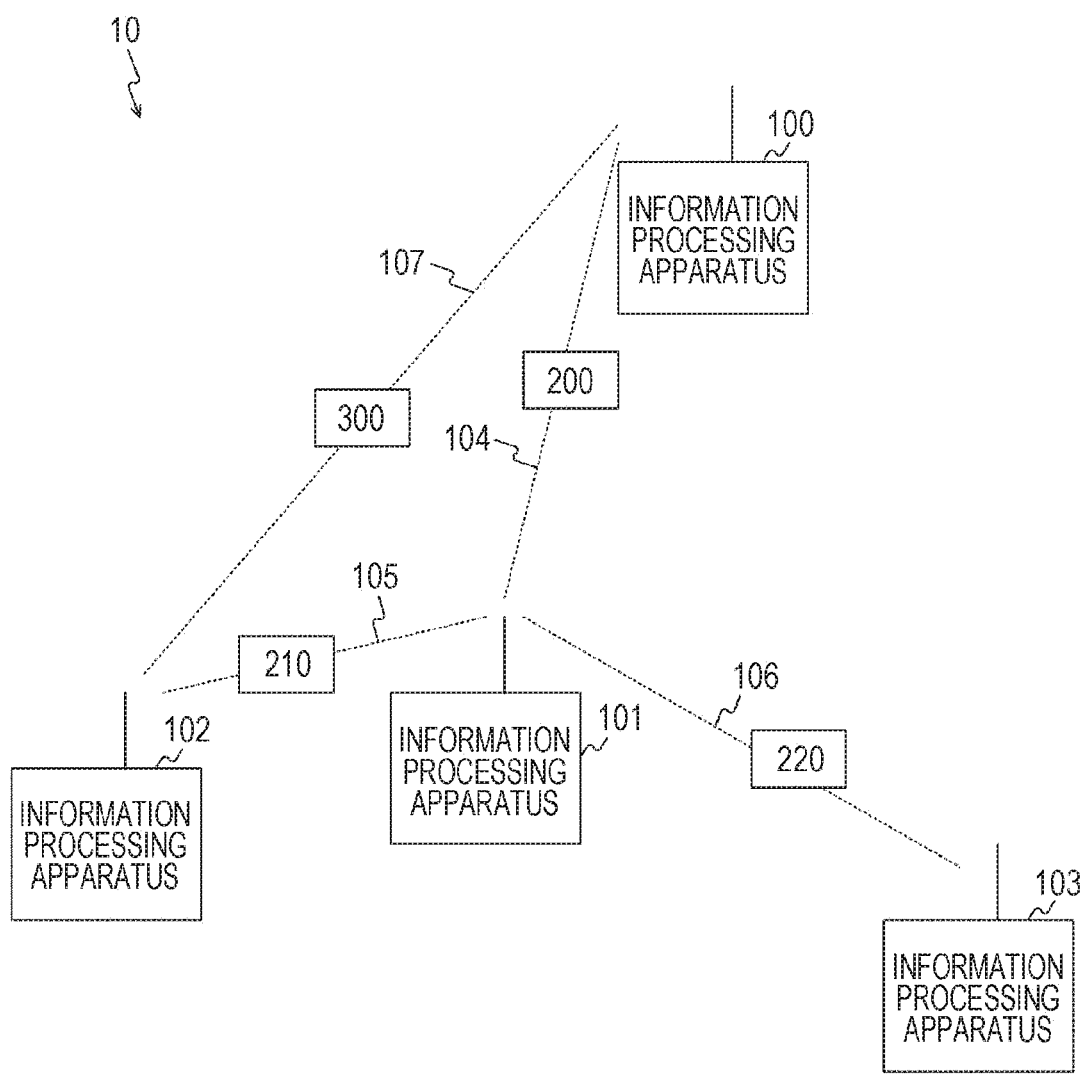
FIG. 1 is a diagram that illustrates the system configuration of a communication system 10 according to an embodiment of the present technology.

FIG. 1 is a diagram that illustrates the system configuration of a communication system 10 according to an embodiment of the present technology.

The communication system 10 includes a plurality of information processing apparatuses (information processing apparatuses 100, 101, 102, and 103). In FIG. 1, communication paths between the apparatuses are denoted by dotted lines 104 to 107. In addition, a path metric value of each communication path is represented inside a rectangle on each dotted line.

Each information processing apparatus (device) configuring the communication system 10, for example, is either a mobile-type information processing apparatus having a radio communication function or a fixed-type information processing apparatus. Here, the mobile-type information processing apparatus is a radio communication apparatus such as a smartphone, a mobile phone, or a tablet terminal, and the fixed-type information processing apparatus is an information processing apparatus such as a printer or a personal computer.

Here, as a communication method for an autonomous connection with an information processing apparatus present on the periphery, ad hoc communication, an ad hoc network, and the like are known. In such a network, each information processing apparatus can communicate with an information processing apparatus present on the periphery thereof without depending on a master station (for example, a control apparatus). Thus, in the case illustrated in FIG. 1, as a communication method for an autonomous connection with an information processing apparatus present on the periphery, an ad hoc network will be described as an example.

In an ad hoc network, when a new information processing apparatus is added to the periphery, this new information processing apparatus can freely participate in the network. For example, first, a case will be considered in which only information processing apparatuses 100 and 101 among information processing apparatuses illustrates in FIG. 1 participate in the ad hoc network. In such a case, an information processing apparatus 102 and an information processing apparatus 103 are assumed to be sequentially added. In such a case, in accordance with an increase in the number of the information processing apparatuses (information processing apparatuses present on the periphery), the covered range of the network can be increased. In other words, in accordance with sequential addition of the information processing apparatus 102 and the information processing apparatus 103, the covered range of the network can be increased.

Here, each of the information processing apparatuses may transmit information to be exchanged with the other information processing apparatuses in a bucket brigade manner instead of being autonomously connected to the other information processing apparatuses present on the periphery.

For example, it is assumed that the information processing apparatus 100 is directly communicable with each of the information processing apparatuses 101 and 102 but is not directly communicable with the information processing apparatus 103 due to no arrival of electric waves or the like.

Also even in a case where direct communication is not executable as above, the information processing apparatus 101 that is directly communicable with the information processing apparatus 100 can transmit data of the information processing apparatus 100 to the information processing apparatus 103. Thus, by transmitting data in this way, the information processing apparatus 100 and the information processing apparatus 103 that is not directly communicable with the information processing apparatus 100 can exchange information thereof through the information processing apparatus 101.

The method of transmitting information to a remote information processing apparatus by executing data transmission (so-called a bucket brigade) as above is called a multi-hop relay. In addition, a network executing the multi hopping is generally known as a mesh network. As technologies for configuring the mesh network, a specification of IEEE (Institute of Electrical and Electronic Engineers) 802.11s-2011 and the like are known.

Figure 2:
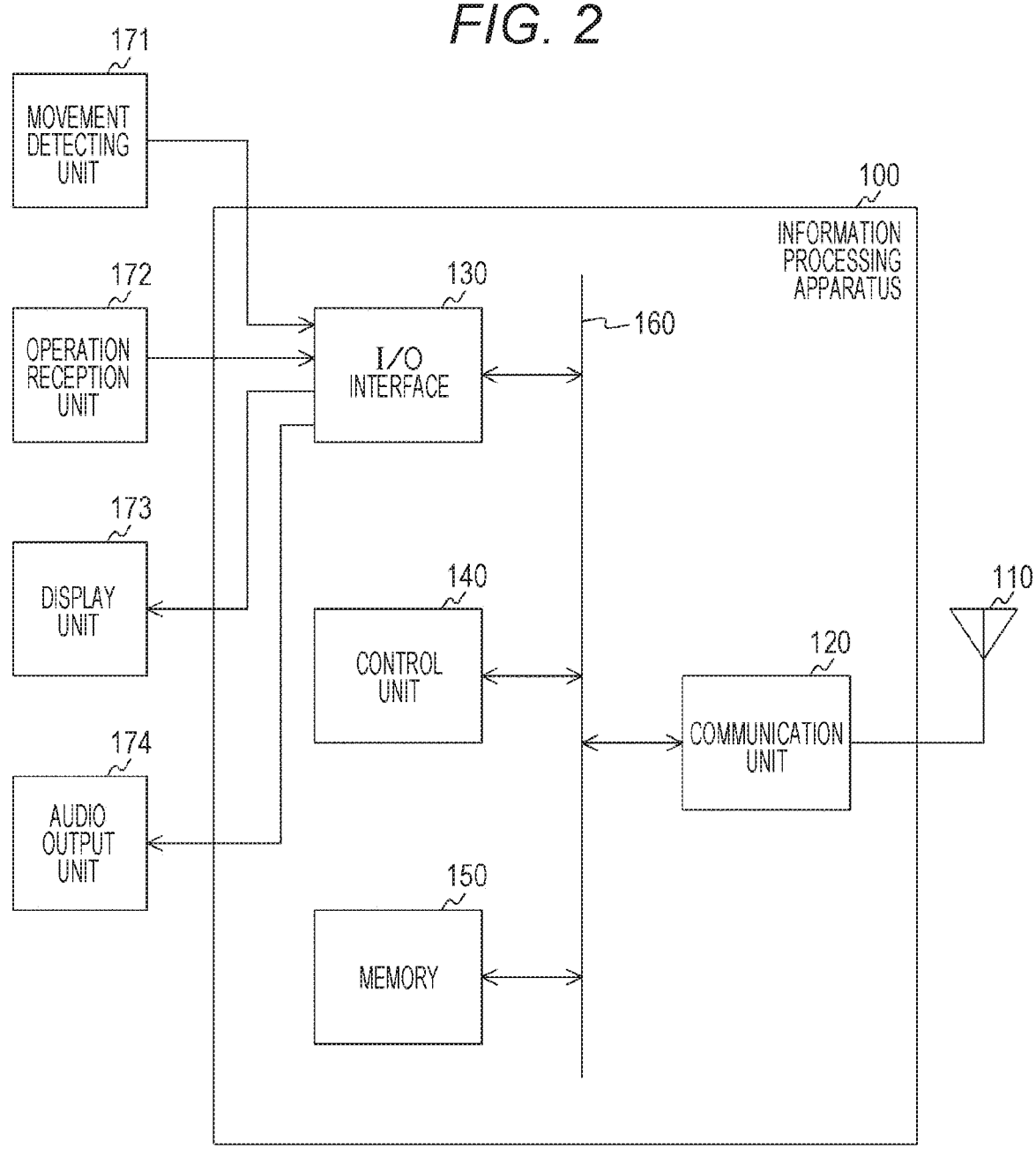
FIG. 2 is a block diagram that illustrates an example of the internal configuration of an information processing apparatus 100 according to an embodiment of the present technology.

An example of the configuration of an information processing apparatus that configures the ad hoc network or the mesh network is illustrated in FIG. 2. The communication system 10 is an example of a network in which a plurality of information processing apparatuses are interconnected by executing one-to-one radio communication between the plurality of information processing apparatuses.

[Configuration Example of Information Processing Apparatus]

FIG. 2 is a block diagram that illustrates an example of the internal configuration of the information processing apparatus 100 according to an embodiment of the present technology. The internal configuration of each of the other information processing apparatuses (the information processing apparatuses 101, 102, and 103) is the same as that of the information processing apparatus 100, and thus, here, only the information processing apparatus 100 will be described, but description of the other information processing apparatuses will not be presented.

The information processing apparatus 100 includes: an antenna 110; a communication unit 120; an input/output (I/O) interface 130; a control unit 140; and a memory 150. Such units are interconnected through a bus 160.

The communication unit 120 is a module (for example, a modem) used for transmitting/receiving electric waves through the antenna 110. For example, the communication unit 120 can execute radio communication through millimeter wave communication (60 GHz or the like), a 900 MHz/2.4 GHz/5 GHz wireless local area network (LAN), or an ultra-wide band (UWB). In addition, for example, the communication unit 120 can execute radio communication through visible light communication or near field communication (NFC).

For example, the communication unit 120, under the control of the control unit 140, exchanges the signals PREQ and PREP used for generating or updating a multi-hop communication path with another information processing apparatus through radio communication. The signals PREQ and PREP will be described in detail with reference to FIGS. 4A to 4D and the like.

The communication unit 120 may execute radio communication using electric waves (electromagnetic waves) or radio communication (for example, radio communication executed using a magnetic field) using a medium other than electric waves.

The I/O interface 130 is an interface for an external apparatus such as a sensor or an actuator operating in cooperation with the information processing apparatus 100. FIG. 2 illustrates an example in which a movement detecting unit 171, an operation reception unit 172, a display unit 173, and an audio output unit 174 are connected to the I/O interface 130 as external apparatuses. In FIG. 2, while the movement detecting unit 171, the operation reception unit 172, the display unit 173, and the audio output unit 174 are arranged outside the information processing apparatus 100, all or some thereof may be built in the information processing apparatus 100.

The movement detecting unit 171 detects the movement of the information processing apparatus 100 by detecting the acceleration, the movement, the inclination, and the like of the information processing apparatus 100 and outputs movement information relating to the detected movement to the control unit 140 through the I/O interface 130. For example, the movement detecting unit 171 maintains the movement information (log (or real-time information relating to the movement)) representing whether the information processing apparatus 100 is moving and supplies the movement information to the control unit 140. As the movement detecting unit 171, for example, an acceleration sensor, a gyro sensor, or a global positioning system (GPS) may be used. For example, the movement detecting unit 171 can calculate a movement distance (for example, a movement distance per unit time) of the information processing apparatus 100 by using positional information (for example, the longitude and the latitude) detected by using the GPS.

The operation reception unit 172 is an operation reception unit that receives an operation input made by a user and outputs operation information according to the received operation input to the control unit 140 through the I/O interface 130. The operation reception unit 172, for example, is realized by a touch panel, a keyboard, or a mouse.

The display unit 173 is a display unit that displays various kinds of information under the control of the control unit 140. As the display unit 173, for example, a display panel such as an electroluminescence (EL) panel or a liquid crystal display (LCD) panel may be used. In addition, the operation reception unit 172 and the display unit 173 may be integrally configured by using a touch panel for which an operation input can be made by the user by placing his finger to be in contact with or in proximity to the display face thereof.

The audio output unit 174 is an audio output unit (for example, a speaker) that outputs various kinds of sounds under the control of the control unit 140.

The control unit 140 controls each unit of the information processing apparatus 100 based on a control program that is stored in the memory 150. For example, the control unit 140 executes signal processing of information that is transmitted or received. The control unit 140, for example, is realized by a central processing unit (CPU).

The memory 150 is a memory in which various kinds of information are stored. For example, in the memory 150, various kinds of information (for example, a control program) that are necessary for information processing apparatus 100 to execute a desired operation are stored. In addition, in the memory 150, for example, a mesh path table 300 illustrated in FIGS. 11A and 11B is stored. Furthermore, in the memory 150, various contents such as a music content and an image content (for example, a moving image content, a still image content) are stored.

For example, in a case where data is transmitted by using radio communication, the control unit 140 processes information read from the memory 150, a signal input from the I/O interface 130, or the like and generates a block (transmission packet) of data that is actually transmitted. Subsequently, the control unit 140 outputs the generated transmission packet to the communication unit 120. In addition, the communication unit 120 converts the transmission packet into a format or the like of a communication system that is actually used for the transmission and then transmits the transmission packet after the conversion from the antenna 110 to the outside.

In addition, for example, in a case where data is received through radio communication, the communication unit 120 extracts a reception packet by executing signal processing of an electric wave signal received through the antenna 110 by using a receiver arranged inside the communication unit 120. Then, the control unit 140 analyzes the extracted reception packet. As a result of the analysis, in a case where data is determined to be stored, the control unit 140 writes the data in the memory 150. On the other hand, in a case where the data is determined to be data to be transmitted to another information processing apparatus, the control unit 140 outputs the data as a transmission packet to be transmitted to the another information processing apparatus to the communication unit 120. In addition, in a case where the data is determined to be data to be transmitted to an external actuator, the control unit 140 outputs the data from the I/O interface 130 to the outside (for example, the display unit 173).

For example, the control unit 140 may provide various contents stored in the memory 150 to the other information processing apparatuses through radio communication.

In addition, in a case where the information processing apparatus 100 is driven by a battery, the battery is mounted (built or installed) in the information processing apparatus 100. In such a case, the control unit 140 may have a function for estimating the remaining battery amount and acquire the estimated remaining battery amount at times.

[Example of Signal Format]

Figure 3A:
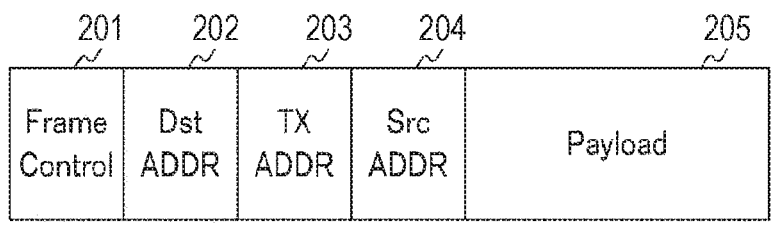
FIGS. 3A to 3C are diagrams that illustrate an example of the signal format of a packet that is exchanged between information processing apparatuses configuring the communication system 10 according to an embodiment of the present technology.
Figure 3B:
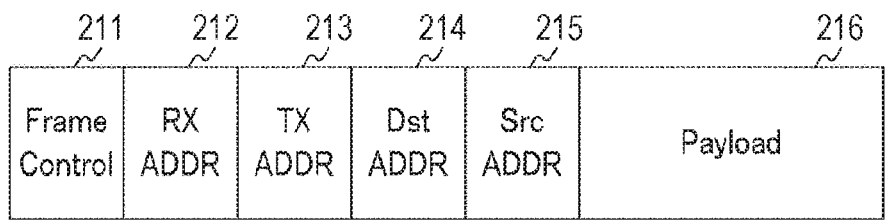
Figure 3C:
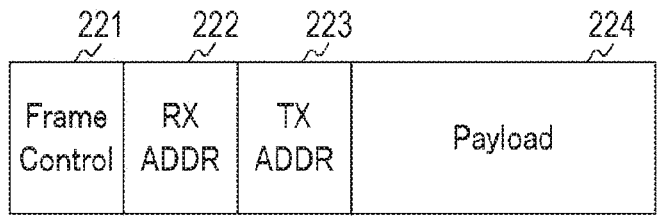

FIGS. 3A to 3C are diagrams that illustrate an example of the signal format of a packet that is exchanged between information processing apparatuses configuring the communication system 10 according to an embodiment of the present technology.

Here, the information processing apparatuses configuring the communication system 10 exchange signals in the form of a packet at the time of execution of communication. In the signal of the form of a packet, there are at least two kinds of packets including a data packet and a management packet.

Here, FIG. 3A illustrates an example of the signal format of a data packet (multicast).

In addition, FIG. 3B illustrates an example of the signal format of a data packet (unicast). Furthermore, FIG. 3C illustrates an example of the signal format of a management packet.

The data packets illustrated in FIGS. 3A and 3B are packets that are used for transmitting application data or the like.

Here, in the specification of IEEE802.11s, the format of a header section is different based on whether a destination is a multicast address. In other words, in a case where the destination is a unicast address, five fields are present in the header section. On the other hand, in a case where the destination is a multicast address, four fields are present in the header section.

More specifically, as illustrated in FIG. 3A, a transmission signal of a data packet (multicast) is configured by a header section (201 to 204) and a payload section 205.

In addition, in the header section, four fields are present. These four fields are Frame Control 201, Dst ADDR 202, TX ADDR 203, and Src ADDR 204.

At the head of the header, Frame Control 201 in which an attribute and the like of a signal including the header are stored is present. Each information processing apparatus can acquire information on whether a packet is a data packet or a management packet used for control or management and the like by referring to Frame Control 201.

In Dst ADDR 202, an identifier (address) representing a destination station (an information processing apparatus by which a packet is finally received) of the packet is stored. Each information processing apparatus can recognize an information processing apparatus to which the signal is to be finally transmitted by referring to Dst ADDR 202. For example, an information processing apparatus that has received a signal, in a case where Dst ADDR 202 is not an identifier (address) of the information processing apparatus, executes a transmission process for transmitting the received signal to a destination station.

In TX ADDR 203, an identifier (address) of the transmission station (an information processing apparatus that has transmitted the packet) of the packet is stored. Each information processing apparatus can recognize an information processing apparatus that has transmitted the signal by referring to TX ADDR 203.

In Src ADDR 204, an identifier (address) of the transmission source station (an information processing apparatus that has transmitted the packet first) of the packet is stored. For example, each information processing apparatus can recognize an information processing apparatus that has transmitted the signal by referring to Src ADDR 204.

As illustrated in FIG. 3B, a transmission signal of a data packet (unicast) is configured by a header section (211 to 215) and a payload section 216.

In the header section, five fields are present. These five fields are Frame Control 211, RX ADDR 212, TX ADDR 213, Dst ADDR 214, and Src ADDR 215. In addition, each of Frame Control 211, TX ADDR 213, Dst ADDR 214, and Src ADDR 215 corresponds to the field having the same name illustrated in FIG. 3A.

In RX ADDR 212, an identifier (address) representing a reception station (an information processing apparatus by which a packet is to be received) of a packet is stored. Each information processing apparatus can recognize an information processing apparatus by which the signal (packet) is to be received by referring to RX ADDR 212. For example, an information processing apparatus that has received a signal (packet), in a case where a content of RX ADDR 212 is the identifier (address) of the information processing apparatus, starts a process of receiving the received signal (packet).

Here, in a case where the destination is a multicast address, as illustrated in FIG. 3A, the RX ADDR field is not present, and Dst ADDR is taken as RX ADDR. For example, in a case where a signal (packet) of the format illustrated in FIG. 3A is received by an information processing apparatus, when Dst ADDR 202 is a broadcast address or an address of a multicast group to which the information processing apparatus belongs, the information processing apparatus starts a process of receiving the signal.

In addition, an information processing apparatus that has received a packet, in a case where a content of Dst ADDR is not the address of the information processing apparatus or in a case where a content of RX ADDR is a multicast address, executes a transmission process for transmitting the received packet to the destination station.

The management packet illustrated in FIG. 3C is a packet that is used for the purpose of generating a network or the purpose of maintaining a network.

As illustrated in FIG. 3C, a transmission signal of a management packet is configured by a header section (221 to 223) and a payload section 224. In addition, three fields are present in the header section. These three fields are Frame Control 221, RX ADDR 222, and TX ADDR 223.

At the head of the header, Frame Control 221 in which an attribute and the like of a signal including the header are stored is present. Each information processing apparatus can acquire information on whether a packet is a data packet or a management packet used for control or management and the like by referring to Frame Control 221.

In RX ADDR 222, an identifier (address) representing a reception station of the packet is stored. Each information processing apparatus can recognize an information processing apparatus by which the signal (packet) is to be received by referring to RX ADDR 222. For example, an information processing apparatus that has received a signal (packet), in a case where a content of RX ADDR 222 is an identifier (address) of the information processing apparatus or a broadcast address, executes a process of receiving the received signal (packet).

In TX ADDR 223, an identifier (address) of a transmission station of the packet is store. Each information processing apparatus can recognize an information processing apparatus that has transmitted the signal by referring to TX ADDR 223.

[Example of Multi-Hop Relay at Time of Execution of Multicast Transmission]

FIGS. 4A to 4D are diagrams that schematically illustrates an example of transitions of a multi-hop relay that is executed by each information processing apparatus configuring the communication system 10 according to an embodiment of the present technology.

Here, in the specification of IEEE 802.11s, a case will be described in which data is transmitted with being addressed to a plurality of information processing apparatuses (multicast) through a multi-hop relay. In such a case, an information processing apparatus that is a transmission source generates and transmits a data packet by using the format of a data packet used for multicast that is illustrated in FIG. 3A.

In addition, in the specification of IEEE 802.11s, at the time of execution of multicast transmission, path information is not generated, but a data packet is transmitted such that the packet is transmitted up to the corners of the network through flooding. The flow of the packet is illustrated in FIGS. 4A to 4D.

FIGS. 4A to 4D illustrates an example of a case where an information processing apparatus 100 that is a transmission source station transmits broadcast data with being addressed to information processing apparatuses 101, 102, and 103. Here, D illustrated in FIGS. 4A to 4D represents DST ADDR, S represents Src ADDR, and T represents TX ADDR. In addition, the information processing apparatuses 100 to 103 are simplified to be represented as 0 to 3. Furthermore, broadcast is represented by A.

Figure 4A:
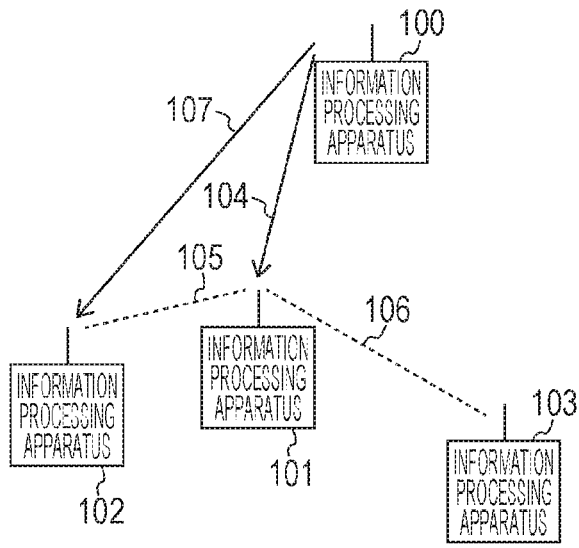
FIGS. 4A to 4D are diagrams that schematically illustrate an example of transitions of a multi-hop relay that is executed by each information processing apparatus configuring the communication system 10 according to an embodiment of the present technology.

For example, in FIG. 4A, an example is illustrated in which a packet having broadcast designated at DST ADDR, TX ADDR set as the information processing apparatus 100, Src ADDR set as the information processing apparatus 100 is transmitted by the information processing apparatus 100. For example, as denoted by arrows 104 and 107, the packet is transmitted from the information processing apparatus 100 to the information processing apparatuses 101 and 102.

Figure 4C:
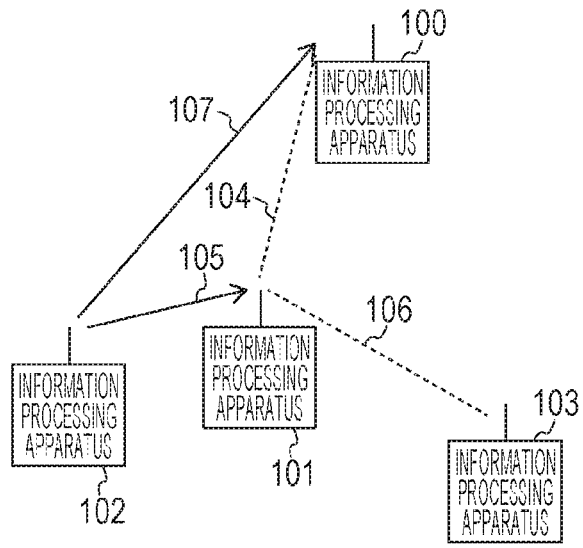
Figure 4B:
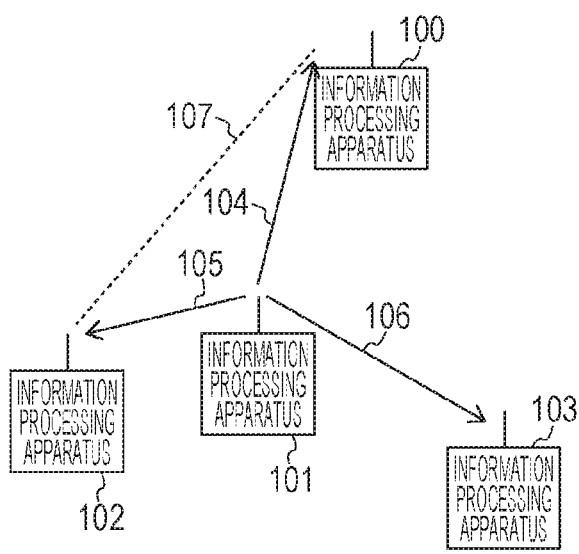

In addition, as illustrated in FIG. 4B, the information processing apparatus 101 that has received the packet from the information processing apparatus 100 rewrites TX ADDR with the information processing apparatus 101 and transmits a packet of the same content. For example, as denoted by arrows 104 to 106, the packet is transmitted from the information processing apparatus 101 to the information processing apparatuses 100, 102, and 103.

Similarly, as illustrated in FIG. 4C, the information processing apparatus 102 that has received the packet from the information processing apparatus 100 (or the information processing apparatus 101) rewrites TX ADDR with the information processing apparatus 102 and transmits a packet of the same content. For example, as denoted by arrows 105 and 107, the packet is transmitted from the information processing apparatus 102 to the information processing apparatuses 100 and 101.

Figure 4D:
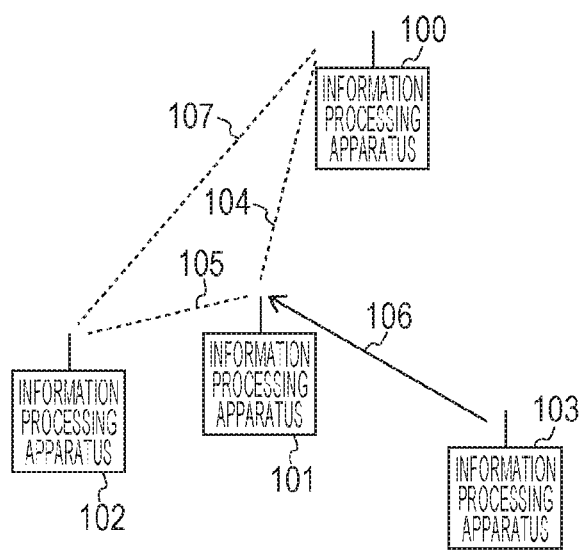

Similarly, as illustrated in FIG. 4D, the information processing apparatus 103 that has received the packet from the information processing apparatus 101 rewrites TX ADDR with the information processing apparatus 103 and transmits a packet of the same content. For example, as denoted by arrow 106, the packet is transmitted from the information processing apparatus 103 to the information processing apparatus 101.

In this way, data transmission of broadcast is attempted for all the information processing apparatuses disposed inside the mesh network.

Here, in a case where data is transmitted with being addressed to a specific information processing apparatus through the multi-hop relay described above (in the case of unicast transmission), before transmission of the data, it is necessary to determine a relay path. This sequence is called a path selection. In this path selection, by exchanging a management signal used for selecting a path between information processing apparatuses, a communication path is determined. The communication path in a mesh network is called a mesh path. FIGS. 5A, 5B and 5C to 7 illustrate the types of management signals used for generating the mesh path and the formats thereof.

[Example of Signal Format]

Figure 5A:
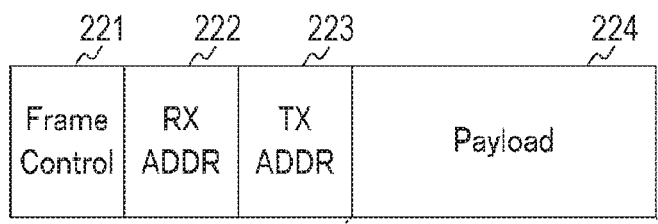
FIGS. 5A to 5C are diagrams that illustrate an example of the signal format of a management packet that is exchanged between information processing apparatuses configuring the communication system 10 according to an embodiment of the present technology.
Figure 5B:
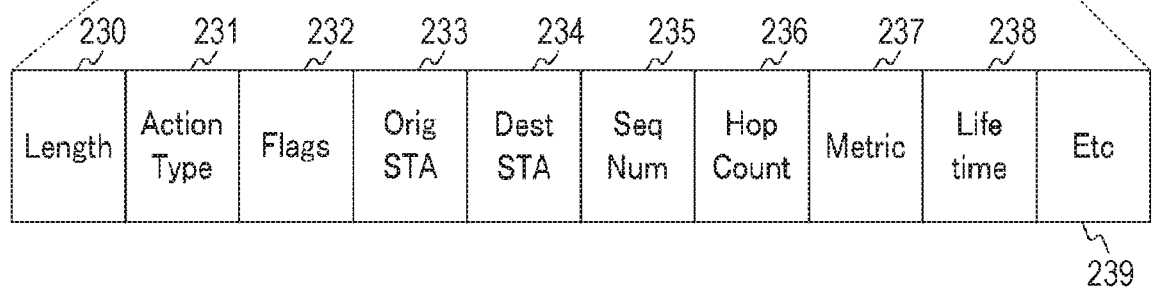
Figure 5C:
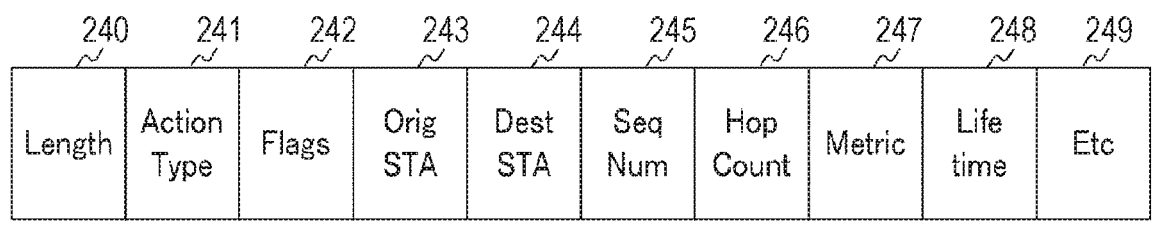

FIGS. 5A to 5C are diagrams that illustrate an example of the signal format of a management packet that is exchanged between information processing apparatuses configuring the communication system 10 according to an embodiment of the present technology. In other words, FIGS. 5A to 5C illustrate the types of management signal used for generating the mesh path and examples of the formats thereof.

FIGS. 6 and 7 are diagrams that illustrate an example of the content of the signal format of a management packet that is exchanged between information processing apparatuses configuring the communication system 10 according to an embodiment of the present technology. In other words, FIGS. 6 and 7 illustrate examples of contents of the signal formats of the management packet illustrated in FIGS. 5A to 5C.

In FIG. 5A, a management packet is illustrated. This management packet is similar to that illustrated in FIG. 3C. As described above, in FrameControl 221 of the management packet, an indication that this signal is a management packet is stored.

In FIGS. 5B and 5C, an example of the configuration of the payload section 224 of the management packet illustrated in FIG. 5A is illustrated. More specifically, FIG. 5B illustrates an example of the configuration of a case where the management packet is a path request signal PREQ. In addition, FIG. 5C illustrates an example of the configuration of a case where the management packet is a path response signal PREP.

The path request signal PREQ illustrated in FIG. 5B is a signal that is used for requesting the generation of a mesh path addressed to a specific information processing apparatus.

As illustrated in FIG. 5B, a plurality of fields 230 to 239 are present in the signal PREQ.

In Length 230, information representing the length of the payload is stored.

In ActionType 231, an identifier that represents that this signal is the signal PREQ is stored. An information processing apparatus that has received the signal can recognize that the received signal is the signal PREQ by referring to ActionType 231.

In Flags 232, information representing the attribute of the signal PREQ is stored.

In OrigSTA 233, an identifier (address) representing an information processing apparatus (transmission source station) of a source requesting the generation of a mesh path is stored. Here, while the signal PREQ is transmitted to a remote place through a multi-hop relay, an information processing apparatus receiving the signal PREQ can recognize an information processing apparatus that is the transmission source station of the received signal PREQ by referring to OrigSTA 233.

In DestSTA 234, an identifier representing an information processing apparatus (destination station) that is the destination requested to generate a mesh path is stored. When the signal PREQ is received, the information processing apparatus (destination station) specified the identifier stored in DestSTA 234 transmits a signal PREP in response thereto. Accordingly, a bi-directional mesh path is generated.

In SeqNum 235, an identifier used for identifying a signal PREQ is stored. For example, every time when a signal PREQ is transmitted from the transmission source station, an incremented value is stored in SeqNum 235. In other words, while there are cases where the signal PREQ is transmitted from a transmission source station a plurality of number of times, an information processing apparatus that has received the signal PREQ can recognize whether or not a received signal PREQ is the same as the PREQ received in the past by referring to SeqNum 235.

In HopCount 236, a numerical value representing the number of hops through which the signal PREQ arrives from the transmission source station (an information processing apparatus that has transmitted the signal PREQ first) is stored. The information processing apparatus that has received the signal PREQ executes multi-hop transmission of the received signal PREQ, and, for each such a transmission process, an incremented value is stored in HopCount 236.

In Metric 237, a value representing a metric value necessary for the arrival from the transmission source station (an information processing apparatus that has transmitted the signal PREQ first) of the signal PREQ is stored. An information processing apparatus receiving the signal PREQ executes multi-hop transmission of the received signal PREQ, and, for each transmission process, a value acquired by accumulatively adding metric values of links between information processing apparatuses is stored in the Metric 237.

In Lifetime 238, information representing the valid period of the mesh path is stored. In other words, when a request for generating a mesh path is successful, a valid mesh path (active mesh path) is generated, and, in Lifetime 238, a value used for specifying the valid period of the mesh path is stored.

In Etc 239, the other management information is stored.

The path response signal PREP illustrated in FIG. 5C is a signal that is used when a response is made for a request for generating a mesh path addressed to a specific information processing apparatus.

As illustrated in FIG. 5C, a plurality of fields 240 to 249 are present in the signal PREP.

In Length 240, information that represents the length of the payload is stored.

In ActionType 241, an identifier that represents that this signal is the signal PREP is stored. An information processing apparatus that has received the signal can recognize that the received signal is the signal PREP by referring to ActionType 241.

In Flags 242, the attribute of the transmission source station (an information processing apparatus that has transmitted the signal PREP first) of the signal PREP is stored.

In OrigSTA 243, an identifier that represents an information processing apparatus that is a source requesting the generation of a mesh path is stored. Here, the identifier of the information processing apparatus (the transmission source station of the signal PREQ) stored in OrigSTA 233 of the signal PREQ is transferred to OrigSTA 243.

In DestSTA 244, an identifier that represents an information processing apparatus that is a destination requested to generate a mesh path is stored. Here, the identifier of the information processing apparatus (the destination station of the signal PREQ) that is stored in DestSTA 234 of the signal PREQ is transferred to DestSTA 244.

In SeqNum 245, an identifier user for identifying a signal PREP is stored. For example, every time when a signal PREP is transmitted from the transmission source station of the signal PREP, an incremented value is stored in SeqNum 245. In other words, there are cases where the signal PREP is transmitted from the transmission source station a plurality of number of times, and a destination station that has received the signal PREP can recognize whether or not the received signal PREP is the same as the signal PREP received in the past by referring to SeqNum 245.

In HopCount 246, a numerical value representing the number of hops through which the signal PREP arrives from the transmission source station of the signal PREP is stored. The information processing apparatus that has received the signal PREP executes multi-hop transmission of the received signal PREP, and, for each such a transmission process, an incremented value is stored in HopCount 246.

In Metric 247, a value representing a metric value necessary for the arrival from the transmission source station of the signal PREP is stored. An information processing apparatus receiving the signal PREP executes multi-hop transmission of the received signal PREP, and, for each transmission process, a value acquired by accumulatively adding metric values of links between information processing apparatuses is stored in the Metric 247.

In Lifetime 248, information representing the valid period of the mesh path is stored. In other words, when a request for generating a mesh path is successful, a valid mesh path (active mesh path) is generated, and, in Lifetime 248, a value used for specifying the valid period of the mesh path is stored.

In Etc 249, the other management information is stored.

The information processing apparatuses configuring the communication system 10 exchange the signals PREQ and PREP, thereby generating path information (also referred to as transmission information or mesh path information) that is necessary when the multi-hop communication is executed. For example, each information processing apparatus exchanges the signals PREQ and PREP, thereby generating a multi-hop communication path at a constant time interval or an irregular time interval. The path information is transmission information used for specifying an information processing apparatus to which the packet is to be transmitted next so as to transmit the packet to the information processing apparatus of the destination. The path information is maintained inside each information processing apparatus as a mesh path table. Then, when a data packet is to be transmitted with being addressed to a specific information processing apparatus, each information processing apparatus determines an information processing apparatus to be designated as a reception station in transmitting the packet. In other words, when a data packet is to be transmitted with being addressed to a specific information processing apparatus, each information processing apparatus determines an information processing apparatus to be designated in RX ADDR 222 in transmitting the packet by referring to the mesh path table. This mesh path table will be described in detail with reference to FIGS. 8A and 8B and 11A and 11B.

[Configuration Example of Mesh Path Table]

FIGS. 8A and 8B are diagrams that schematically illustrate an example (mesh path table 250) of the mesh path table that is maintained by each information processing apparatus configuring the communication system 10 according to an embodiment of the present technology.

Here, FIG. 8A schematically illustrates the configuration of the mesh path table 250, and FIG. 8B illustrates an example of the content of the mesh path table 250. More specifically, in FIG. 8B, as an example of the content of the mesh path table 250, Index 256, Data Name 257, and Meaning 258 are illustrated.

As illustrated in FIG. 8A, the mesh path table 250 is recorded in the memory 150 in the form of records. In addition, the mesh path table 250 is configured such that each record can be extracted using an address (Dest 251) of the destination station as the key. As records of the mesh path table 250, NextHop 252, Metric 253, SeqNum 254, and ExpTime 255 are stored. In addition, in FIG. 8B, signs a to d used for identifying the records are assigned to Index 256.

In NextHop 252 of Index 256 "a", an identifier of an information processing apparatus representing an information processing apparatus to which data is to be transmitted so as to transmit the data to the destination station is stored. In other words, the identifier of a transmission station is stored in NextHop 252.

In Metric 253 of Index 256 "b", a path metric value from the apparatus to which the mesh path table belongs to the destination station of the mesh path is stored.

In SeqNum 254 of Index 256 "c", a SeqNum value (for example, SeqNum 235 or 245 illustrated in FIGS. 5B and 5C) of the signal PREQ or the signal PREP used for the generation of a mesh path is stored.

In ExpTime 255 of Index 256 "d", the valid period of the mesh path is stored. The valid period of the mesh path is determined based on Lifetime 238 or 248 (illustrated in FIGS. 5B and 5C) of the signal PREQ or the signal PREP used for the generation of the mesh path.

At the time of requesting the generation of a path or responding thereto, each information processing apparatus configuring the communication system 10 generates path information and writes the generated path information into the mesh path table 250. In addition, in order to transmit data, each information processing apparatus configuring the communication system 10, based on the address Dest 251 of a destination station to which the data is to be transmitted, extracts each record corresponding to the destination station from the mesh path table 250. Then, the information processing apparatus executes a transmission process of transmitting the data to the transmission station corresponding to NextHop 252 of each record that has been extracted.

[Example of Generation of Unicast Mesh Path]

FIGS. 9A, 9B, 9C and 9D and 10A and 10B are diagrams that schematically illustrate an example of the generation of a unicast mesh path that is executed by each information processing apparatus configuring the communication system 10 according to an embodiment of the present technology. In FIGS. 9A, 9B, 9C and 9D and 10A and 10B, an example of generation of a mesh path table using the signals PREQ and PREP described above will be described.

In FIGS. 9A, 9B, 9C and 9D and 10A and 10B, in the topology illustrated in FIG. 1, a case will be described as an example in which the information processing apparatus 100 requests the generation of a mesh path between the information processing apparatuses 101 to 103.

Here, in the specification of IEEE 802.11s, while a plurality of members for generating a mesh path are defined. Here, an example of a case where the signal PREQ is proactively transmitted that is closest to the embodiment of the present technology will be described. In FIGS. 9A, 9B, 9C and 9D and 10A and 10B, D represents DST ADDR, O represents Orig ADDR, and T represents TX ADDR. In addition, information processing apparatuses 100 to 103 are simplified to be represented as 0 to 3. Furthermore, broadcast is represented as A.

Figure 9A:
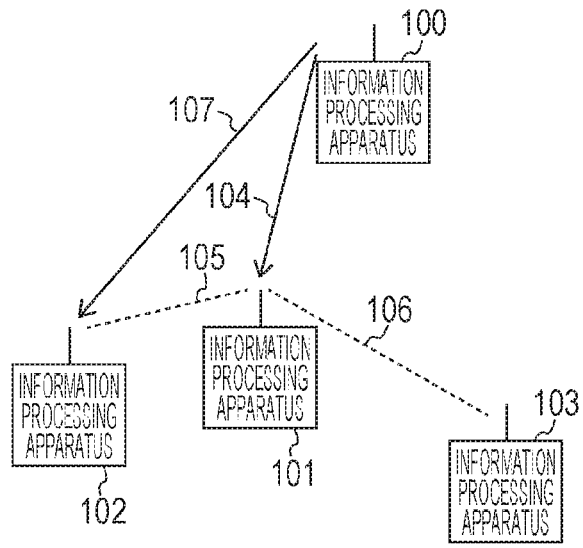
FIGS. 9A to 9D are diagrams that schematically illustrate an example of generation of a unicast mesh path that is executed by each information processing apparatus configuring the communication system 10 according to an embodiment of the present technology.

First, as illustrated in FIG. 9A, in order to generate mesh paths with all the other information processing apparatuses, the information processing apparatus 100 transmits a signal PREQ in which a broadcast address is designated in Dest STA 234 (illustrated in FIG. 5B). For example, as denoted by arrows 104 and 107, the signal PREQ is transmitted from the information processing apparatus 100 to the information processing apparatuses 101 and 102.

In this signal PREQ, zeros are stored in HopCount 236 and Metric 237 (illustrated in FIG. 5B) as initial values, and a value acquired by incrementing a value written in the signal PREQ that has been previously transmitted is stored in SeqNum 235 (illustrated in FIG. 5B). In addition, a broadcast address (D=A) is set in RX ADDR 222 (illustrated in FIG. 5A), whereby each information processing apparatus present on the periphery of the information processing apparatus is designated as a reception station.

When the signal PREQ is received, each of the information processing apparatuses 101 and 102 generates mesh path information addressed to an information processing apparatus (in other words, addressed to the information processing apparatus 100) having the identifier stored in Orig STA 233 (illustrated in FIG. 5A) of the signal PREQ. In other words, the mesh path information is recorded as information of a record relating to the information processing apparatus 100 in the mesh path table 250 (illustrated in FIGS. 8A and 8B).

In this case, in NextHop 252 of Index 256 "a", the value of TX ADDR 223 (illustrated in FIG. 5A) of the signal PREQ is written. In addition, in Metric 253 of Index 256 "b", a value acquired by adding a metric value of a link between the transmission station of the signal PREQ and the apparatus, which has received the signal PREQ, to a value stored in Metric 237 (illustrated in FIG. 5B) of the signal PREQ is written as a "path metric value". The transmission station of the signal PREQ is an information processing apparatus (in other words, the information processing apparatus 100) designated by TX ADDR 223 (illustrated in FIG. 5A). As the metric value of the link between the transmission station of the signal PREQ and the apparatus, for example, a value representing the transmission speed [Mbps (Mega bit per second)] enabled in the link is used.

In addition, in SeqNum 254 of Index 256 "c", a value stored in SeqNum 235 (illustrated in FIG. 5B) of the signal PREQ is written. Furthermore, in ExpTime 255 of Index 256 "d", a value acquired by adding the value stored in Lifetime 238 (illustrated in FIG. 5B) of the signal PREQ to the reception time of the signal PREQ is written. Until this valid period, the mesh path is regarded to be valid and is referred to.

Figure 9B:
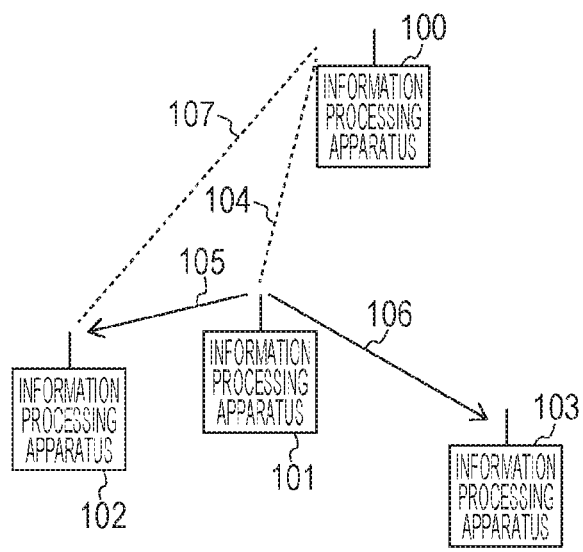

Each of the information processing apparatuses 101 and 102 that have received the signal PREQ transmits the signal PREQ so as to transfer the signal PREQ to another information processing apparatus. At the time of executing this transmission process, each of the information processing apparatuses 101 and 102 increments HopCount 236 (illustrated in FIG. 5B) and stores the "path metric value" that has been previously calculated in Metric 237 (illustrated in FIG. 5B). In addition, into the other fields of the signal PREQ, the values of the received PREQ are transferred. In other words, the broadcast address is set in RX ADDR 222 (illustrated in FIG. 5A), each information processing apparatus present on the periphery is designated as a reception station, and the address of the apparatus, to which the mesh path table belongs, is written into TX ADDR 223 (illustrated in FIG. 5A). In FIG. 9B, only the signal PREQ transmitted by the information processing apparatus 101 is illustrated, and the signal PREQ transmitted by the information processing apparatus 102 is not illustrated.

In addition, when the transmitted PREQ is received, the information processing apparatus 103, similarly, generates mesh path information addressed to the information processing apparatus (in other words, addressed to the information processing apparatus 100) having the identifier stored in Orig STA 233 (illustrated in FIG. 5A) of the signal PREQ. In other words, the mesh path information is recorded as information of a record relating to the information processing apparatus 100 in the mesh path table 250 (illustrated in FIGS. 8A and 8B).

Here, a case may be considered in which each of the information processing apparatuses 101 to 103 receives a plurality of signals PREQ from one or a plurality of information processing apparatuses present on the periphery. In such a case, a path having a small "path metric value" is selected as a valid mesh path, and the signals PREQ of which the "path metric value" is large are discarded.

In addition, in FIGS. 9A, 9B, 9C and 9D and 10A and 10B, an example is illustrated in which the broadcast address is written in Dest STA of the signal PREQ transmitted by the information processing apparatus 100. For this reason, it is assumed that all the information processing apparatuses respond to the signal PREQ (transmit the signal PREP). Thus, hereinafter, a case will be described as an example in which each information processing apparatus transmits the signal PREP.

Figure 9C:
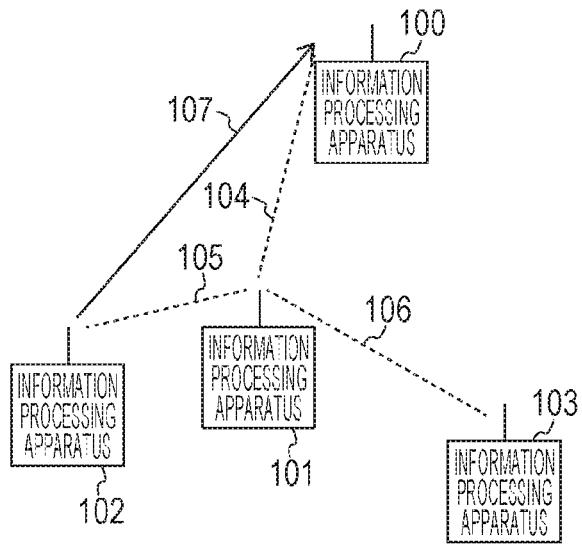

For example, the information processing apparatus 102 directly receives a signal PREQ transmitted from the information processing apparatus 100 and receives a signal PREQ through the information processing apparatus 101. In such a case, the path metric value (300 (illustrated in FIG. 1)) of the signal PREQ directly received from the information processing apparatus 100 is compared with the path metric value (200+210 (illustrated in FIG. 1)) of the signal PREQ received through the information processing apparatus 101. As a result of the comparison, the path metric value of the signal PREQ that has been directly received from the information processing apparatus 100 is smaller than that of the other signal PREQ. For this reason, as illustrated in FIG. 9C, the information processing apparatus 102 directly transmits the signal PREP to the information processing apparatus 100.

More specifically, the address of the information processing apparatus 102 is written in Dest STA 244 (illustrated in FIG. 5C), and the value written in the signal PREQ is transferred into Orig STA 243 (illustrated in FIG. 5C). In addition, in HopCount 246 and Metric 247 (illustrated in FIG. 5C), zeros are stored as initial values, and a value acquired by incrementing the value written in the signal PREQ or the signal PREP that has been previously transmitted is stored in SeqNum 245 (illustrated in FIG. 5C).

In addition, Nexthop addressed to Orig STA 233 (illustrated in FIG. 5B) of the signal PREQ (the information processing apparatus 100) is set in RX ADDR 222 (illustrated in FIG. 5A), and the address of the information processing apparatus 102 is written in TX ADDR 223 (illustrated in FIG. 5A). Then, the information processing apparatus 102 transmits the signal PREP to the information processing apparatus 100 through unicast.

Figure 9D:
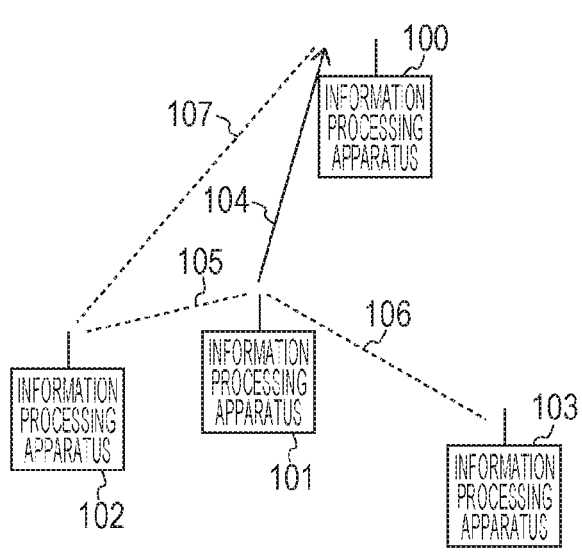

In addition, as illustrated in FIG. 9D, similarly, the information processing apparatus 101 transmits the signal PREP to the information processing apparatus 100.

In this way, as the information processing apparatus 100 receives the signal PREP, mesh path information addressed to Dest STA 244 (the information processing apparatuses 101 and 102) of the signal PREP can be generated. In other words, in the mesh path table 250 (illustrated in FIGS. 8A and 8B), the mesh path information is recorded as information of records relating to the information processing apparatuses 101 and 102. In addition, since the information processing apparatus 100 is designated in Orig STA 243 of the received signal PREP, the information processing apparatus 100 does not execute a subsequent transmission process.

Figure 10A:
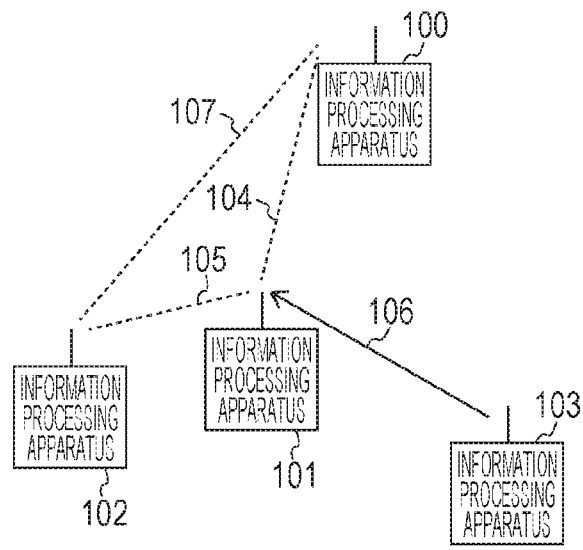
FIGS. 10A and 10B are diagrams that schematically illustrate an example of generation of a unicast mesh path that is executed by each information processing apparatus configuring the communication system 10 according to an embodiment of the present technology.

As illustrated in FIG. 10A, since the signal PREQ is received through the information processing apparatus 101, the information processing apparatus 103 transmits a signal PREP used for generating a mesh path through the information processing apparatus 101. More specifically, the address of the information processing apparatus 103 is written in Dest STA 244 (illustrated in FIG. 5C), and a value written in the signal PREQ is transferred into Orig STA 243 (illustrated in FIG. 5C). In addition, in HopCount 246 and Metric 247 (illustrated in FIG. 5C), zeros are stored as initial values, and a value acquired by incrementing the value written in the signal PREQ or the signal PREP that has been previously transmitted is stored in SeqNum 245 (illustrated in FIG. 5C). Furthermore, Nexthop addressed to Orig STA 233 (illustrated in FIG. 5B) (the information processing apparatus 100) of the signal PREQ is set in RX ADDR 222 (illustrated in FIG. 5B), and the address of the information processing apparatus 103 is written into TX ADDR 223 (illustrated in FIG. 5A). Then, as illustrated in FIG. 10A, the information processing apparatus 103 transmits the signal PREP to the information processing apparatus 101 through unicast.

When the signal PREP is received, the information processing apparatus 101 generates mesh path information addressed to Dest STA 244 (the information processing apparatus 103) of the signal PREP. In other words, the mesh path information is recorded as information of a record relating to the information processing apparatus 103 in the mesh path table 250 (illustrated in FIGS. 8A and 8B). Through this process, the information processing apparatus 101 can generate a mesh path addressed to the information processing apparatus 103.

Figure 10B:
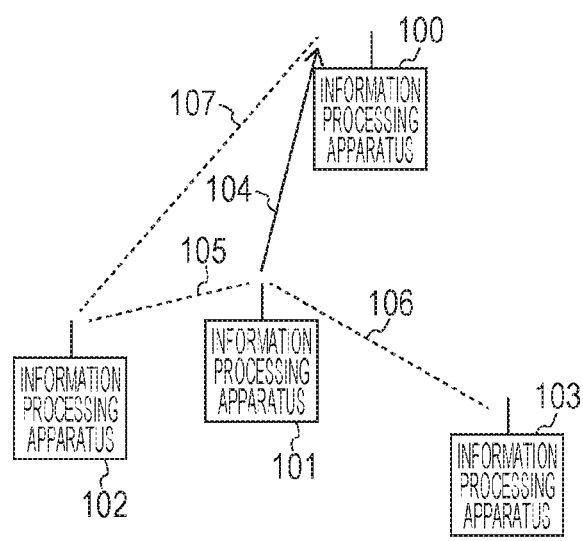

In addition, as illustrated in FIG. 10B, since the information processing apparatus 101 is not Orig STA 243, the information processing apparatus 101 transmits the signal PREP addressed to Orig STA 243. At the time of execution of this transmission process, the information processing apparatus 101 increments HopCount 246, stores the calculated "path metric value" in Metric 247, and transfers the value of the received signal PREP into the other fields of the signal PREP. In addition, in RX ADDR 222, the information processing apparatus 101 sets the address (in this case, the information processing apparatus 100) of Nexthop of the mesh path addressed to the information processing apparatus 100 and transmits the signal PREP through unicast.

When the signal PREP is received, the information processing apparatus 100 generates mesh path information addressed to Dest STA 244 (the information processing apparatus 103) of the signal PREP. In other words, in the mesh path table 250, the mesh path information is recorded as information of a record relating to the information processing apparatus 103. Through this process, the information processing apparatus 100 can generate a mesh path addressed to the information processing apparatus 103.

In addition, since the information processing apparatus 100 is designated as Orig STA 243 of the signal PREP, the information processing apparatus 100 does not execute a subsequent transmission process but ends a bi-directional mesh path generating process between the information processing apparatus 100 and each information processing apparatus. Through this process, three mesh paths through the information processing apparatus 100 and the information processing apparatus 101, through the information processing apparatus 100 and the information processing apparatus 102, and through the information processing apparatus 100 and the information processing apparatus 103 via the information processing apparatus 101 are generated.

Thereafter, until the valid period (ExpTime 255 illustrated in FIGS. 8A and 8B) of the mesh path, when data is exchanged between the information processing apparatus 100 and the information processing apparatuses 101 to 103, the mesh path record generated inside each information processing apparatus can be referred to. In other words, when data is exchanged between the information processing apparatus 100 and the information processing apparatuses 101 to 103, by referring to the mesh path record generated inside each information processing apparatus, multi-hop relay communication can be executed.

In addition, by executing the transmission of the signal PREQ described above at a constant interval, the information processing apparatus 100 can execute an update such that the valid period of the mesh path does not end.

As a technology for configuring the radio network system described above, the specification of IEEE 802.11-2012 (IEEE Standard for Information technology—Telecommunications and information exchange between systems Local and metropolitan area networks—Specific requirements Part 11: Wireless LAN Medium Access Control (MAC) and Physical Layer (PHY) Specifications) is widely known. In addition, the specification of IEEE 802.11s is accepted as a part of IEEE 802.11-2012.

Here, in the specification of IEEE 802.11s, a structure for setting a path used for multicast communication for transmitting/receiving the same information among a plurality of unspecified information processing apparatuses is not defined. Thus, in a case where multicast transmission is executed in compliance with the specification of IEEE 802.11s, it may be considered to execute the following (1) or (2).

(1) Information transmission is executed through broadcast at a media access control (MAC) level.

(2) Transmission is executed through expansion into a plurality of unicast communications at an application level.

Here, in a case where information transmission is executed using broadcast at the MAC level, each information processing apparatus executes a transmission process by using a packet addressed to simple broadcasting. For this reason, the structure of an automatic repeat-request (ARQ) (automatic retransmission request) may not be used together, and there is concern that it is difficult to execute robust transmission on a media of a wireless LAN in which collision of signals and the like constantly occur. In addition, in the broadcast transmission of the specification of IEEE 802.11s, while a plan for loop transmission is implemented, basically, transmission that is based on simple flooding is executed. For this reason, it is assumed that it is difficult to execute efficient information transmission.

In addition, in a case where the transmission is executed through expansion into a plurality of unicast communications at the application level, end-end retransmission control of a transmission control protocol (TCP) layer or the like can be used. For this reason, from the viewpoint of the lack of information, a relatively-high communication quality can be easily provided. However, in a case where the number of delivery destinations of the information increases (particularly, in a case where there are many deliveries for a plurality of hops), it is necessary to transmit the same information to a plurality of destinations more than once. For this reason, it is important to reduce the waste of the bandwidth.

Thus, an embodiment of the present technology illustrates an example in which multi-hop multicast transmission is executed by simply extending a part of the hybrid wireless mesh protocol (HWMP) of the specification of IEEE 802.11s. Accordingly, a robust structure for efficiently executing multi-hop multicast transmission can be defined.

More specifically, in the embodiment of the present technology, an example is illustrated in which a multicast mesh path is generated, maintained, and managed based on the exchange of the signals PREQ and PREP described above.

In addition, by using the multicast mesh path generated as such, multicast transmission of a data packet addressed to each information processing apparatus belonging to a multicast group inside a mesh network from an information processing apparatus that is a transmission source of the data packet is executed. In such a case, robust transmission using a unicast packet format that additionally uses the ARQ is executed. In addition, efficient multi-hop relaying is executed, and information of multicast can be transmitted also to information processing apparatuses at which electric waves do not directly arrive.

In order to realize such multicast transmission, in the embodiment of the present technology, one information processing apparatus among information processing apparatuses configuring a mesh network is set as a root station for the generation of a multicast path.

[Example of Participation in Multicast Group and Setting of Root Station]

Here, a method of participating in a multicast group for executing multicast transmission and an example of setting a root station will be described.

For example, the participation of an information processing apparatus in a multicast group largely depends on the context of an application and thus, can be dynamically set.

For example, each information processing apparatus sets a multicast group to which the apparatus belongs in accordance with an instruction from an upper layer. When such an instruction is made, each information processing apparatus is in the state of participating in a certain multicast group and is controlled so as to be included in a multicast mesh path.

In addition, in the embodiment of the present technology, a multicast mesh path is generated based on the above-described mechanism of proactively transmitting the signal PREQ. In other words, one information processing apparatus that serves as a root station of the multicast tree in the network is necessary. As this root station, for example, an information processing apparatus that is the transmission source of a content that is delivered through multicast may be set. This root station is allocated in accordance with an instruction supplied from the upper layer described above. In addition, the root station transmits the signal PREQ regularly (or irregularly). Each information processing apparatus other than the root station (in other words, an information processing apparatus that is a delivery destination of a content) participating in the multicast group serves as a member station. This member station is allocated in accordance with an instruction supplied from the upper layer described above as well. This member station executes a process of returning the signal PREP.

In addition, in the mesh network, there are cases where an information processing apparatus that is neither a root station nor a member station is present. In other words, it may not be determined that the multicast mesh path necessarily delivers information between all the information processing apparatuses within the mesh network. However, an information processing apparatus not participating in a multicast group that is a target also executes the process of transmitting the signals PREQ and PREP.

[Configuration Example of Mesh Path Table]

FIGS. 11A and 11B are diagrams that schematically illustrates an example (mesh path table 300) of a mesh path table that is maintained by each information processing apparatus configuring the communication system 10 according to an embodiment of the present technology.

In FIG. 11A, the configuration of the mesh path table 300 is schematically illustrated, and FIG. 11B illustrates an example of the content of the mesh path table 300. The mesh path table 300 is an example of a mesh path table having the multicast address as a destination and is acquired by adding new information (Index 256 "e" to "g") to the mesh path table 250 illustrated in FIGS. 8A and 8B. Thus, the same reference numeral is assigned to each part common to that of the mesh path table 250 illustrated in FIGS. 8A and 8B, and description thereof will not be presented.

In FIGS. 11A and 11B, while an example is illustrated in which new information groups (Index 256 "e" to "g") are managed together with the information of the mesh path table 250 illustrated in FIGS. 8A and 8B, the new information groups may be managed using a table other than the mesh path table 250.

In RootFlag 301 of Index 256 "e", a flag representing that this mesh path maintains a path addressed to the root station is stored. In other words, a flag representing whether this mesh path is generated according to the reception of the signal PREQ is stored therein. For example, in the case of a mesh path generated according to the reception of the signal PREQ, "1" is stored therein. On the other hand, in the case of a mesh path not generated according to the reception of the signal PREQ, "0" is stored therein.

In Link_metric 302 of Index 256 "f", a metric value of the mesh path up to Nexthop is stored. This metric corresponding to one link is called a link metric.

In ProactivePath 303 of Index 256 "g", a flag representing that this mesh path maintains a path addressed to the member station is stored. In other words, a flag representing whether this mesh path is generated according to the reception of the signal PREP is store. For example, in the case of a mesh path generated according to the reception of the signal PREP, "1" is stored therein. On the other hand, in the case of a mesh path not generated according to the reception of the signal PREP, "0" is stored therein.

In addition, only any one of RootFlag 301 and Proactive-Path 303 may be configured to be recorded.

Each of such entries is recorded as a target in a corresponding record at the time of reception of the signal PREQ and at the time of reception of the signal PREP and is referred to.

As described above, in regard to a destination for unicast, a record can be extracted from the mesh path table 300 by using a destination station address as the key. In this case, Nexthop 252 maintained in each record is one.

On the other hand, in regard to a multicast mesh path, each record of the mesh path table 300 maintains a multicast address as a destination station address. However, since there are cases where a plurality of information processing apparatuses that are destinations of the multicast are present, there are cases where a plurality of Nexthops of the multicast mesh path are present. In order to accommodate such a situation, there are cases where a plurality of records storing the same destination station address are present in the mesh path table 300. In addition, in relation to the destination of the multicast, a different method of designating a record is used between a case where a record in which the destination is a root station is extracted and a case where a record in which the destination is a member station is extracted.

More specifically, in a case where a record storing a path to the root station is to be extracted, the record is extracted by using a set of a destination address "Dest 251" and "RootFlag 301" as the key. For example, a record in which the designated multicast address is stored in "Dest 251", and one is set in "RootFlag 301" is extracted from the mesh path table 300.

On the other hand, in a case where a record storing a path to the member station is to be extracted, a record is extracted by using a set of the destination address "Dest 251" and "Nexthop 252" as the key. For example, a record in which the designated multicast address is stored in "Dest 251", and the designated Nexthop address is stored in "Nexthop 252" is extracted from the mesh path table 300.

[Example of Generation of Multicast Mesh Path]

FIGS. 12A, 12B, 12C and 12D and 13A and 13B are diagrams that schematically illustrate an example of generation of a multicast mesh path that is executed by each information processing apparatus configuring the communication system 10 according to an embodiment of the present technology.

FIGS. 14A and 14B and 15A and 15B are diagrams that schematically illustrate an example of a mesh path table that is generated by each information processing apparatus configuring the communication system 10 according to an embodiment of the present technology.

In FIGS. 12A, 12B, 12C and 12D and 13A and 13B, as described above, an example of a case where a multicast mesh path of a multicast address Addr-A is generated by exchanging the signals PREQ and PREP will be described.

In addition, FIGS. 12A, 12B, 12C and 12D and 13A and 13B illustrate an example of a case where an information processing apparatus 100 is set as a root station, and an information processing apparatus 102 and an information processing apparatus 103 are set as member stations in the topology illustrated in FIG. 1. In addition, in the topology illustrated in FIG. 1, the metric value of each link (denoted by dotted lines 104 to 107) is assumed to be a value represented inside a rectangle on the dotted line. Further- more, "D", "O", and "T" illustrated in each figure are similar to those of the example illustrated in FIGS. 9A, 9B, 9C and 9D and 10A and 10B.

Figure 12A:
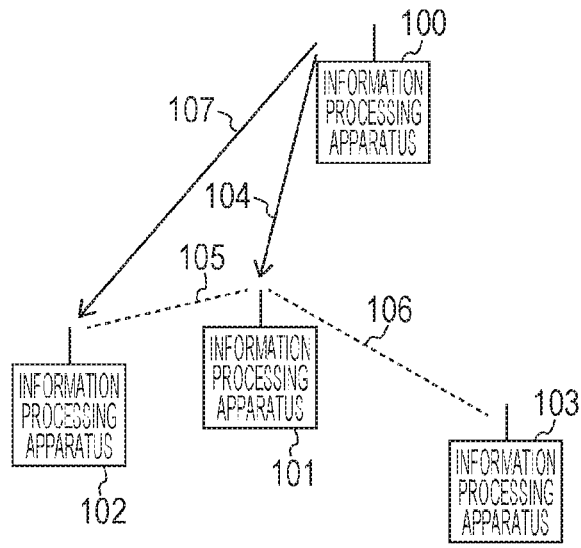
FIGS. 12A to 12D are diagrams that schematically illustrate an example of generation of a multicast mesh path that is executed by each information processing apparatus configuring the communication system 10 according to an embodiment of the present technology.
Figure 12B:
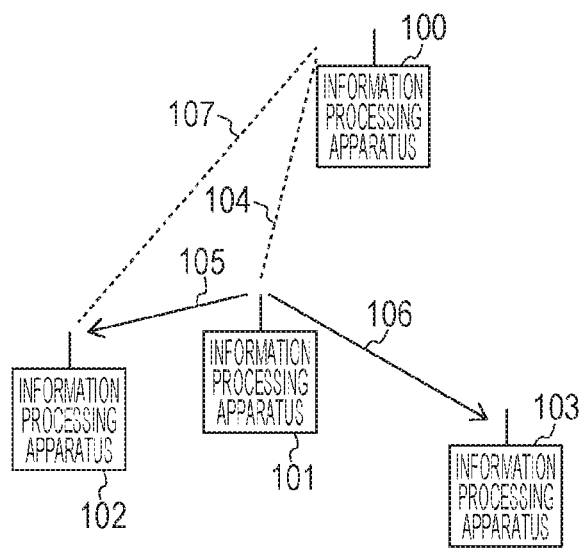

First, as illustrated in FIGS. 12A and 12B, a proactive signal PREQ is transmitted. More specifically, as illustrated in FIG. 12A, the information processing apparatus 100 regularly transmits the signal PREQ. In this signal PREQ, Addr-A is stored in Dest STA 234 (illustrated in FIG. 5B), "0" is stored in Orig STA 233 (illustrated in FIG. 5B), and "0" is stored in TX ADDR 223 (illustrated in FIG. 5B).

In addition, as illustrated in FIG. 12B, the information processing apparatus 101 that has received the signal PREQ executes a PREQ transmission process of transmitting the signal PREQ. In this transmitted signal PREQ, Addr-A is stored in Dest STA 234, "0" is stored in Orig STA 233, and "1" is stored in TX ADDR 223.

In addition, while the information processing apparatus 102 and the information processing apparatus 103 also execute the PREQ transmission process, here, it does not have any influence on the generation of a mesh path and thus, is not illustrated in the figure.

Here, each member station (each of the information processing apparatus 102 and the information processing apparatus 103) independently generates a path for which a path metric up to the root station (the information processing apparatus 100) is minimal. For this reason, as illustrated in FIGS. 12C and 12D and FIG. 13A, similarly to the case of the generation of a unicast mesh path described above, a response PREP to the received signal PREQ is transmitted.

Figure 12C:
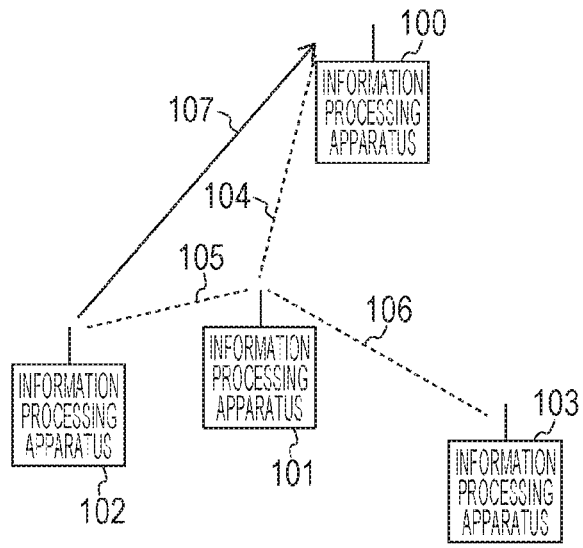
Figure 12D:
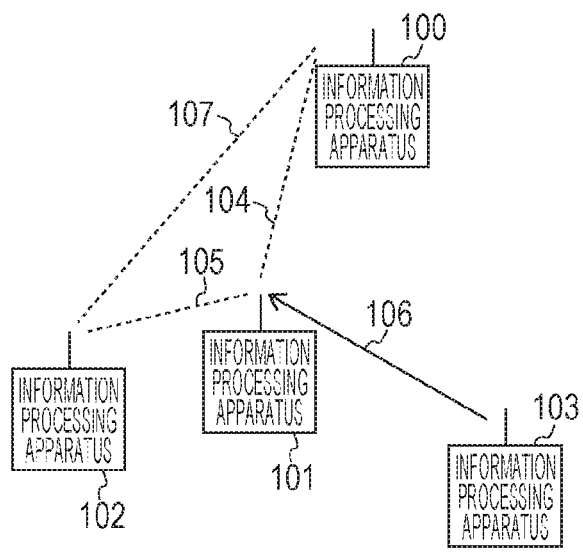
Figure 13A:
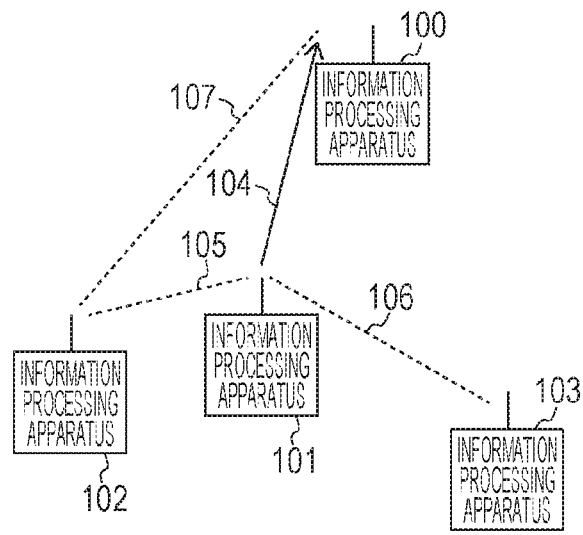
FIGS. 13A and 13B are diagrams that schematically illustrate an example of generation of a multicast mesh path that is executed by each information processing apparatus configuring the communication system 10 according to an embodiment of the present technology.

For example, as illustrated in FIG. 12C, the information processing apparatus 102 directly transmits the signal PREP to the information processing apparatus 100, and a link between the information processing apparatus 100 and the information processing apparatus 102 is determined as a part of the multicast mesh path of Addr-A. In addition, for example, as illustrated in FIG. 12D and FIG. 13A, the information processing apparatus 103 transmits the signal PREP to the information processing apparatus 100 through a relay station (the information processing apparatus 101). For this reason, the link between the information processing apparatus 100 and the information processing apparatus 102 that passes through the information processing apparatus 101 is determined as a part of the multicast mesh path of Addr-A.

Figure 13B:
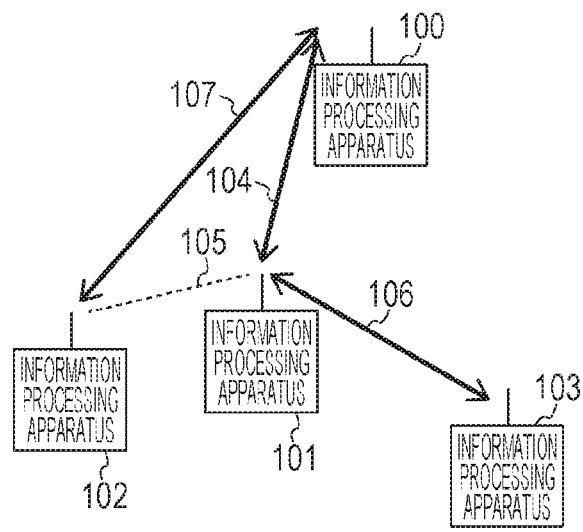

As above, by exchanging the signals PREQ and PREP, a multicast mesh path is generated. In FIG. 13B, the generated multicast mesh path is denoted by thick-line arrows. As illustrated in FIG. 13B, frames having a destination Addr-A can be transmitted/received among the information processing apparatus 100, the information processing apparatus 102, and the information processing apparatus 103.

An example of the mesh path table 300 generated in each information processing apparatus when the exchange of the signals PREQ and PREP illustrated in FIGS. 12A to 12D and FIG. 13A is executed is illustrated in FIGS. 14A and 14B and 15A and 15B. More specifically, FIG. 14A illustrates a mesh path table generated in the information processing apparatus 100, and FIG. 14B illustrates a mesh path table generated in the information processing apparatus 101. In addition, FIG. 15A illustrates a mesh path table generated in the information processing apparatus 102, and FIG. 15B illustrates a mesh path table generated in the information processing apparatus 103.

Next, an example of the operation of each information processing apparatus will be described.

[Example of Transmission of Proactive Signal PREQ]

Figure 16:
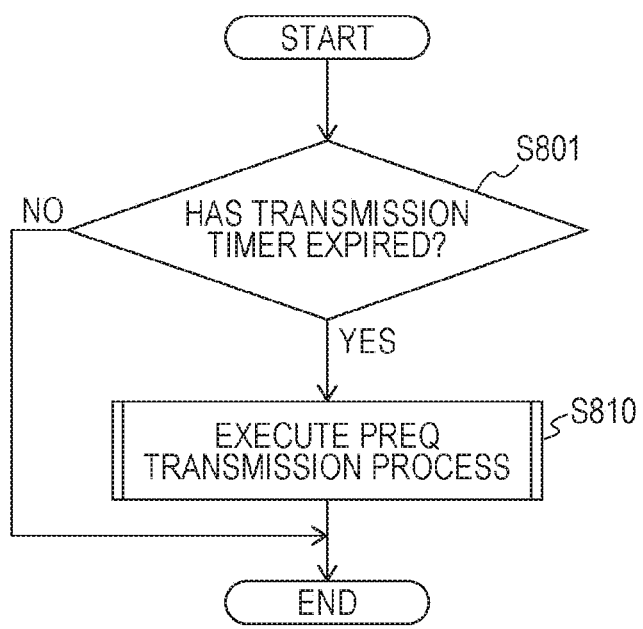
FIG. 16 is a flowchart that illustrates an example of the processing sequence of a transmission process executed by the information processing apparatus 100 according to an embodiment of the present technology.

FIG. 16 is a flowchart that illustrates an example of the processing sequence of a transmission process executed by the information processing apparatus 100 according to an embodiment of the present technology.

FIG. 16 illustrates an example of a case where the information processing apparatus 100 is instructed from an upper layer to operate as a root station of a multicast group. In such a case, the control unit 140 of the information processing apparatus 100 regularly executes a process of transmitting the proactive signal PREQ (steps S801 and S810). In other words, the control unit 140 of the information processing apparatus 100 determines whether or not a regular transmission timer has expired (step S801). Then, in a case where the regular transmission timer has expired (step S801), a PREQ transmission process is executed (step S810). Step S810 is an example of the transmission sequence according to an embodiment of the present disclosure.

In this way, the proactive signal PREQ is repeatedly transmitted every time when the regular transmission timer expires. In this case, in Dest STA 234 (illustrated in FIG. 5A) of the proactive signal PREQ, a multicast address of the multicast group instructed from the upper layer is stored. Here, in the specification of IEEE 802.11S, an operation of storing a multicast address other than the broadcast address in Dest STA is not defined. For this reason, in the embodiment of the present technology, a new operation of storing the multicast address in Dest STA is started up.

In addition, similarly to the ordinary proactive signal PREQ, in RX ADDR 222 (illustrated in FIG. 5A) of the signal PREQ, a broadcast address is stored, and transmission to the entire network is attempted.

Here, in a case where an active mesh path relating to the multicast address is present, in order to configure the transmission of the signal PREQ to be reliable, it is preferable to additionally use unicast transmission for neighboring information processing apparatuses corresponding to Nexthop. This PREQ transmission process will be described in detail with reference to FIG. 17.

In FIG. 16, while an example has been illustrated in which the proactive signal PREQ transmission process is executed regularly, the proactive signal PREQ transmission process may be executed irregularly or intermittently. For example, the proactive signal PREQ transmission process may be executed at timing when the state of one information processing apparatus changes (for example, moves).

Figure 17:
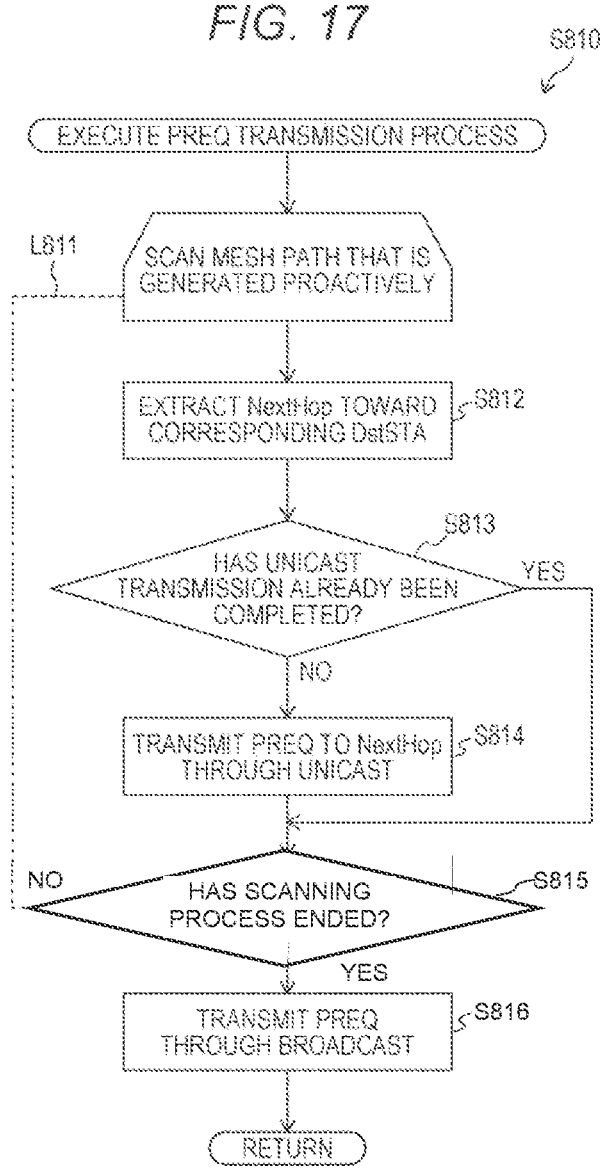
FIG. 17 is a flowchart that illustrates an example of a PREQ transmission process sequence of the processing sequence of a transmission process executed by the information processing apparatus 100 according to an embodiment of the present technology.

FIG. 17 is a flowchart that illustrates an example of a signal PREQ transmission process sequence (the processing sequence of step S810 illustrated in FIG. 16) of the processing sequence of a transmission process executed by the information processing apparatus 100 according to an embodiment of the present technology.

When the proactive signal PREQ transmission process is started, the control unit 140 of the information processing apparatus 100 scans records of the mesh path table 300 (Loop L811). Then, the control unit 140 stores the multicast address of the multicast group instructed from the upper layer in Dest 251 and scans the mesh path that is generated proactively (Loop L811). Here, whether or not a mesh path is the mesh path generated proactively can be checked by referring to ProactivePath 303 (illustrated in FIGS. 11A and 11B) of the record. This ProactivePath 303 is set when the signal PREP is received.

Then, in a case where there is a corresponding record (Loop L811), the control unit 140 extracts Nexthop 252 (illustrated in FIGS. 11A and 11B) of the record (step S812).

Then, the control unit 140 determines whether or not the proactive signal PREQ has been transmitted to Nexthop through unicast in this proactive signal PREQ transmission process (step S813).

In a case where the proactive signal PREQ has not been transmitted to Nexthop through unicast (step S813), the control unit 140 transmits the proactive signal PREQ toward Nexthop through unicast (step S814).

In a case where the proactive signal PREQ has been transmitted to Nexthop through unicast (step S813), each process described above is repeatedly executed until the scanning process ends (Loop L811).

When the scanning process ends (Loop L811), the control unit 140 transmits the proactive signal PREQ through broadcast (step S815). In this way, the proactive signal PREQ can be stably transmitted as is necessary.

As above, in a case where the information processing apparatus 100 is set as a root station transmitting a content (for example, an image content or a music content) through multicast, the control unit 140 executes control such that a path request signal PREQ requesting to generate a multicast transmission path is transmitted. In such a case, the control unit 140 stores the multicast address of the multicast group instructed from the upper layer in the destination address (Dest STA 234 (illustrated in FIG. 5A)) of the path request signal PREQ and transmits the path request signal.

In addition, in a case where the path request signal PREQ is received, the control unit 140 transmits the path request signal to a neighboring information processing apparatus specified by the path information (the record of the mesh path table) through unicast transmission.

In FIG. 17, while an example has been illustrated in which the proactive signal PREQ is transmitted through unicast before the broadcast transmission, the order of the broadcast transmission and the unicast transmission may be reversed. In addition, in a case where the proactive signal PREQ is transmitted toward all the neighboring information processing apparatuses through unicast, the broadcast transmission may be omitted without executing the broadcast transmission.

[Example of Reception of Proactive Signal PREQ]

Figure 18:
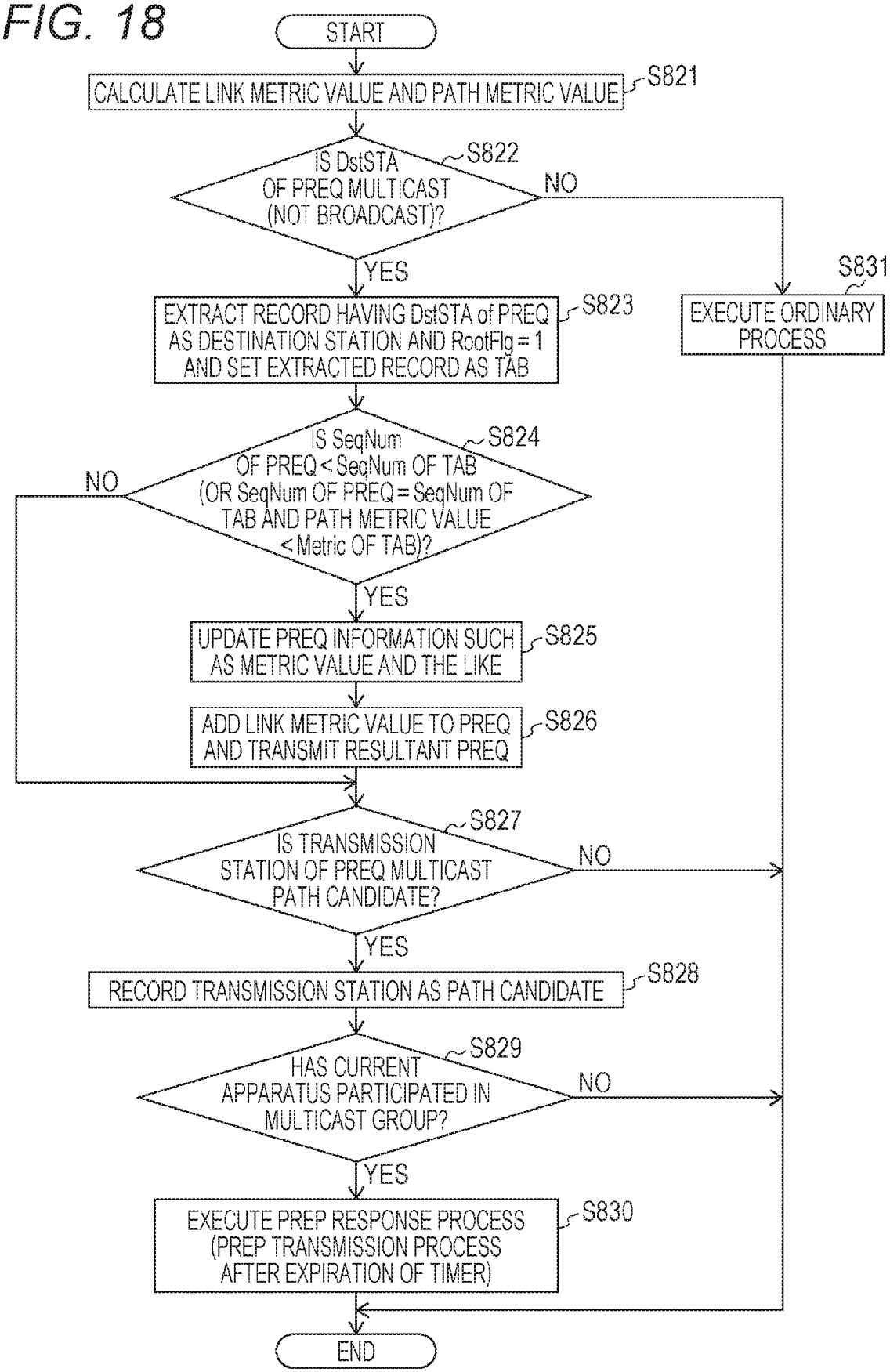
FIG. 18 is a flowchart that illustrates an example of the processing sequence of a reception process executed by the information processing apparatus 100 according to an embodiment of the present technology.

FIG. 18 is a flowchart that illustrates an example of the processing sequence of a reception process executed by the information processing apparatus 100 according to an embodiment of the present technology. FIG. 18 illustrates an example of the operation of a case where the information processing apparatus 100 receives the signal PREQ. The processing sequence illustrated in FIG. 18 is an example of a reception sequence according to an embodiment of the present disclosure.

The control unit 140 of the information processing apparatus 100 calculates a metric value (link metric value) between the transmission station (an information processing apparatus having the identifier stored in TX ADDR 223 (illustrated in FIG. 5A)) of the received signal PREQ and the information processing apparatus 100 (step S821). In addition, the control unit 140 calculates a value (path metric value) acquired by adding the link metric value to a value stored in Metric 237 (illustrated in FIG. 5B) of the received signal PREQ (step S821).

Subsequently, the control unit 140 checks a content stored in Dest STA 234 (illustrated in FIG. 5B) of the received signal PREQ (step S822). Then, in a case where a unicast address or a broadcast address is stored in Dest STA 234 of the received signal PREQ (step S822), the control unit 140 executes an ordinary process (the process of generating a unicast mesh path) (step S831). This ordinary process is each process described above, and thus, detailed description thereof will not be presented here.

On the other hand, in a case where a multicast address other than the broadcast address is stored in Dest STA 234 of the received signal PREQ (step S822), the control unit 140 executes an extraction process executed from the mesh path table 300 (step S823). In other words, the control unit 140 sets the address stored in Dest STA 234 of the received signal PREQ as the destination station (Dest 251) and extracts a record in which "1" is set in RootFlag 301 from the mesh path table 300 (step S823). In FIG. 18, the extracted record will be described with being represented as a structure variable TAB. In addition, in a case where such a record is not present, the control unit 140 generates a new record in the mesh path table 300.

Subsequently, the control unit 140 determines whether or not the value of SeqNum 235 (illustrated in FIG. 5B) of the received signal PREQ is smaller than the value of SeqNum of the TAB (step S824). Alternatively, the control unit 140 determines whether or not the value of SeqNum 235 of the received signal PREQ and the value of SeqNum of the TAB coincide with each other, and the calculated path metric value is smaller than the metric value written in the TAB (step S824).

In a case where any one thereof is satisfied, the control unit 140 determines that the transmission station of the received signal PREQ is a candidate for a path of a minimal metric value toward the destination station of the extracted record (step S824). In such a case, the control unit 140 stores the calculated path metric value in Metric 253 (illustrated in FIGS. 11A and 11B) of the record (step S825). Subsequently, the control unit 140 updates Metric 237 (illustrated in FIG. 5B) of the received signal PREQ with the calculated path metric value, increments HopCount 236 (illustrated in FIG. 5B) to be updated, and executes the signal PREQ transmission process (step S826). This transmission process is equivalent to the process illustrated in FIG. 17.

On the other hand, in a case where the transmission station is determined not to be a candidate for the path of a minimal metric (step S824), the process of transmitting the received signal PREQ is not executed, but the process proceeds to step S827.

Subsequently, the control unit 140 determines whether or not the transmission station of the received signal PREQ is a candidate (a candidate for a multicast path) for a transmission path toward the destination station of the extracted record (step S827). This determination may be made by using the same criterion as that of the determination of whether or not the transmission station is a "candidate for a path of a minimal metric" (step S824) or a criterion different from that of the above-described determination. The process executed in a case where the determination is made using such a different criterion will be described in detail with reference to FIG. 21.

Here, in a case where the transmission station is determined not to be a candidate for a multicast path (a candidate for a transmission path) (step S827), the operation of the PREQ reception process ends.

On the other hand, in a case where the transmission station is determined to be a candidate for a multicast path (a candidate for a transmission path) (step S827), the control unit 140 updates the value of the TAB and records the transmission station as a path candidate (step S828). More specifically, the address of TX ADDR 223 (illustrated in FIG. 5B) of the received signal PREQ is stored in Nexthop 252 (illustrated in FIGS. 11A and 11B) of the extracted record. In addition, the value of SeqNum 235 (illustrated in FIG. 5B) of the received signal PREQ is stored in SeqNum 254 (illustrated in FIGS. 11A and 11B). Furthermore, a value acquired by adding the current time to Lifetime 238 (illustrated in FIG. 5B) of the received signal PREQ is stored in ExpTime 255 (illustrated in FIGS. 11A and 11B). In addition, "1" is set in RootFlag 301 (FIGS. 11A and 11B), the calculated link metric value is stored in Link_metric 302 (illustrated in FIGS. 11A and 11B), and "0" is set in ProactivePath 303 (illustrated in FIGS. 11A and 11B). Such a recording process (step S828) corresponds to a process of temporarily storing path candidate information. In this temporary storage process, a member for separately recording the determined information and the candidate information by saving values in the other entries once or the like may be additionally used.

Subsequently, the control unit 140 determines whether or not the information processing apparatus 100 belongs to the multicast group of the address stored in Dest STA 234 of the received signal PREQ (step S829). In a case where the information processing apparatus 100 is set as a member station in the multicast group (step S829), the control unit 140 starts up a PREP response process (step S830). Here, after the starting-up of the PREP response process, the control unit 140 does not instantly execute the PREP response process but sets a timer for having a preparation time until the transmission of the signal PREP. Then, after the timer expires, the control unit 140 executes a PREP transmission process. This PREP transmission process will be described in detail with reference to FIG. 19.

On the other hand, in a case where the information processing apparatus 100 does not belong to the multicast group (step S829), the operation of the PREP reception process ends without executing the PREP response process.

[Example of Transmission of Signal PREP]

Figure 19:
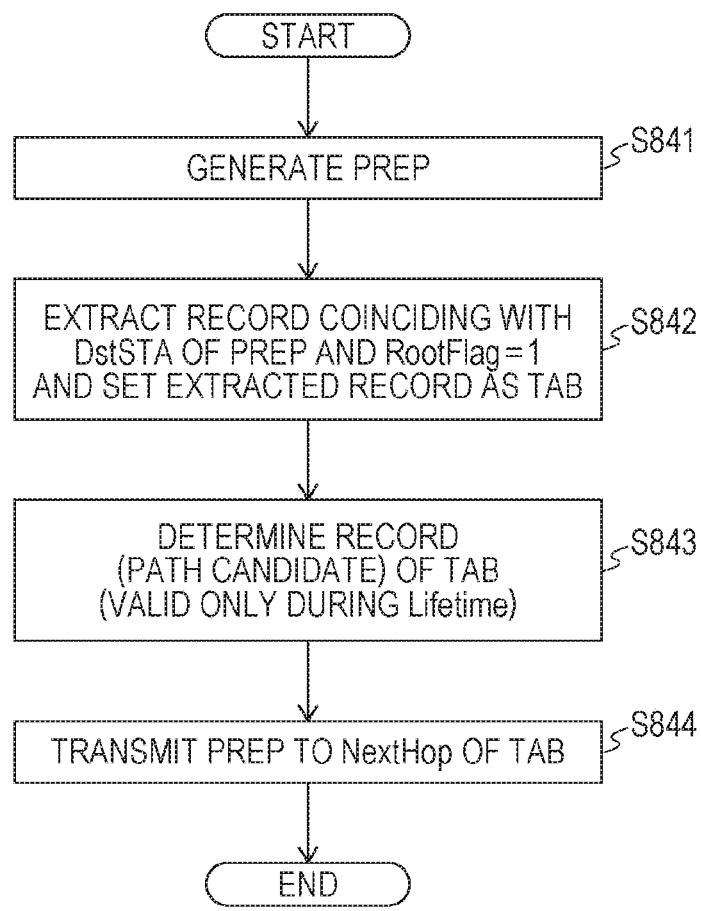
FIG. 19 is a flowchart that illustrates an example of the processing sequence of the PREP transmission process executed by the information processing apparatus 100 according to an embodiment of the present technology.

FIG. 19 is a flowchart that illustrates an example of the processing sequence of the PREP transmission process executed by the information processing apparatus 100 according to an embodiment of the present technology.

The control unit 140 of the information processing apparatus 100 generates a signal PREP to be transmitted (step S841). The generation of the signal PREP, as described above, is executed by copying information stored in each field of the received signal PREQ. However, in a case where multicast transmission is executed, the identifier of the signal PREP is not stored in SeqNum 245 (illustrated in FIG. 5C) of the signal PREP, and SeqNum 235 (illustrated in FIG. 5B) of the signal PREQ is copied and stored, which is different from the above-described case.

Subsequently, the control unit 140 executes an extraction process for extraction from the mesh path table 300 (step S842). In other words, the control unit 140 sets the address stored in Dest STA 244 (illustrated in FIG. 5C) of the signal PREP as the destination station (Dest 251) and extracts a record in which "1" is set in RootFlag 301 from the mesh path table 300. This record is generated when the signal PREQ is received. In FIG. 19, the record will be described with being represented as a structure variable TAB.

As a value of the TAB, information recorded as a path candidate when the signal PREQ has been previously received is written. The control unit 140 determines the candidate information as regular path information (step S843). At this time point, the value of the TAB becomes the path information that is referred to when a packet is transmitted (step S843). In addition, the value of the TAB is valid until time stored in ExpTime 255 (illustrated in FIGS. 11A and 11B) (until Lifetime expires). For this reason, thereafter, in a case where there is no update of the record after the time stored in ExpTime 255, the control unit 140 discards the record from the mesh path table 300, thereby eliminating the mesh path. Here, steps S822 to S828 and S843 configure an example of a control sequence according to an embodiment of the present disclosure.

Subsequently, the control unit 140 transmits the generated signal PREP toward Nexthop 252 (illustrated in FIGS. 11A and 11B) of the TAB (with the address of Nexthop 252 stored in RX ADDR 222 (illustrated in FIG. 5A)) through unicast (step S844).

The signal PREP transmitted in this way is received by an information processing apparatus (neighboring information processing apparatus) having the identifier stored in RX ADDR 222. A PREP reception process executed by the information processing apparatus that has received the signal PREP will be described in detail with reference to FIG. 20.

[Example of Reception of Signal PREP]

Figure 20:
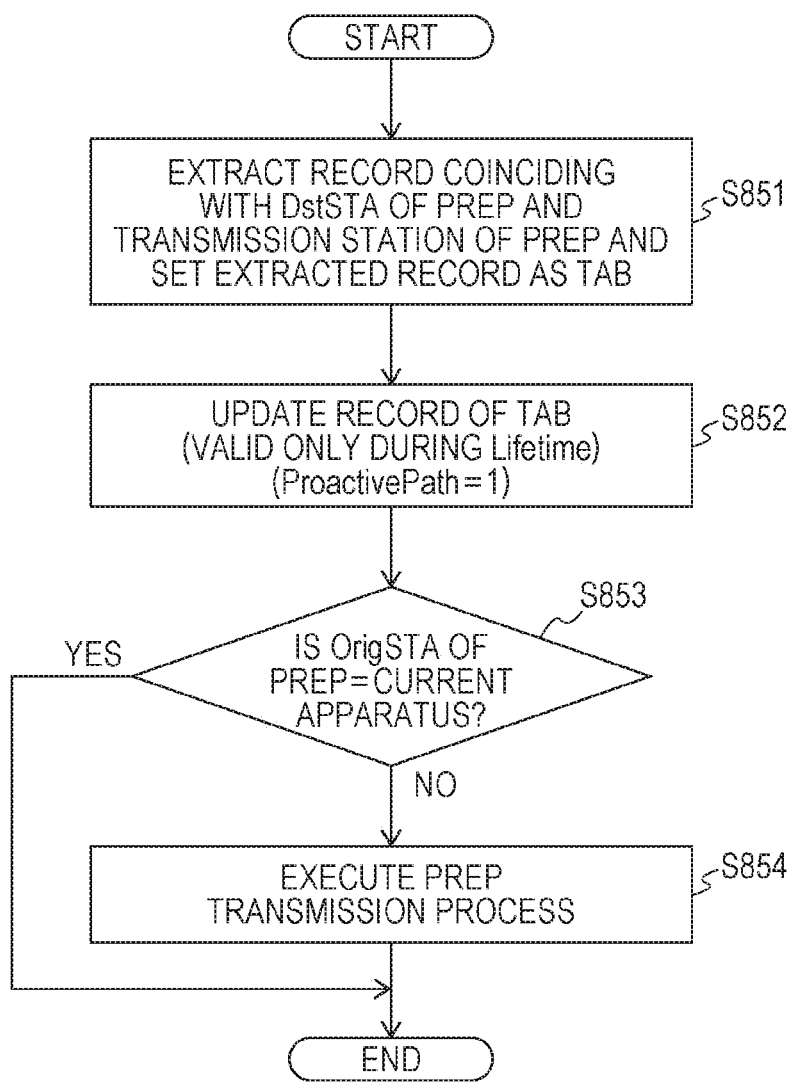
FIG. 20 is a flowchart that illustrates an example of the processing sequence of the PREP reception process executed by the information processing apparatus 100 according to an embodiment of the present technology.

FIG. 20 is a flowchart that illustrates an example of the processing sequence of the PREP reception process executed by the information processing apparatus 100 according to an embodiment of the present technology.

First, the control unit 140 executes an extraction process for extraction from the mesh path table 300 (step S851). In other words, the control unit 140 sets the address stored in Dest STA 244 of the received signal PREP as the destination station and extracts a record in which the address stored in TX ADDR 223 of the signal PREP is stored in Nexthop 252 (step S851). In a case where there is no corresponding record in the mesh path table 300, the control unit 140 generates a new record. In FIG. 20, the extracted record will be described with being represented as a structure variable TAB.

Subsequently, the control unit 140 updates the record of the TAB (step S852). In other words, the control unit 140 stores the value of SeqNum 245 (illustrated in FIG. 5C) of the received signal PREP in SeqNum 254 (illustrated in FIGS. 11A and 11B) of the extracted record. In addition, the control unit 140 stores a value acquired by adding the current time to Lifetime 248 (illustrated in FIG. 5C) of the received signal PREP in ExpTime 255 (illustrated in FIGS. 11A and 11B) of the extracted record. Furthermore, the control unit 140 sets "0" to RootFlag 301 (illustrated in FIGS. 11A and 11B) of the extracted record and sets "1" to ProactivePath 303 (illustrated in FIGS. 11A and 11B) (step S852). This update process is a process corresponding to the setting of a mesh path.

The value of the TAB is valid until time stored in ExpTime 255 (until Lifetime expires). Thereafter, in a case where there is no update of the record (TAB) after the time stored in ExpTime 255, the control unit 140 discards the record from the mesh path table 300, thereby eliminating the mesh path.

Subsequently, the control unit 140 determines whether or not an apparatus to which the control unit 140 belongs is Orig STA 243 (illustrated in FIG. 5C) of the received signal PREP (step S853). In a case where the apparatus is Orig STA 243 of the received signal PREP (step S853), the operation of the PREP reception process ends.

On the other hand, in a case where the apparatus is not Orig STA 243 of the received signal PREP (step S853), the control unit 140 executes the PREP transmission process (step S854). In other words, the control unit 140 copies information of each field of the received signal PREP so as to generate a signal PREP. However, the link metric value is added to Metric 247 (illustrated in FIG. 5C) of the signal PREP so as to be updated, and HopCount 246 (illustrated in FIG. 5C) is incremented so as to be updated, whereby the signal PREP is generated. Then, the signal PREP is transmitted by the PREP transmission process illustrated in FIG. 19.

In this way, the control unit 140 maintains path information relating to a communication path specified by the path request signal PREQ as a path information candidate (multicast path candidate) of multicast transmission. Then, the control unit 140 determines the path information candidate as path information of the multicast transmission at timing when the path response signal PREP used for responding to the path request signal PREQ is transmitted.

In addition, in a case where the path response signal PREP corresponding to the path request signal PREQ is received, the control unit 140 generates path information used for executing multicast transmission based on the path response signal.

Furthermore, in a case where the destination address of the path request signal PREQ is a multicast address, and the apparatus, to which the control unit 140 belongs, belongs to a group specified by the multicast address, the control unit 140 transmits the path response signal PREP.

[Example of Determination of Multicast Path Candidate]

Figure 21:
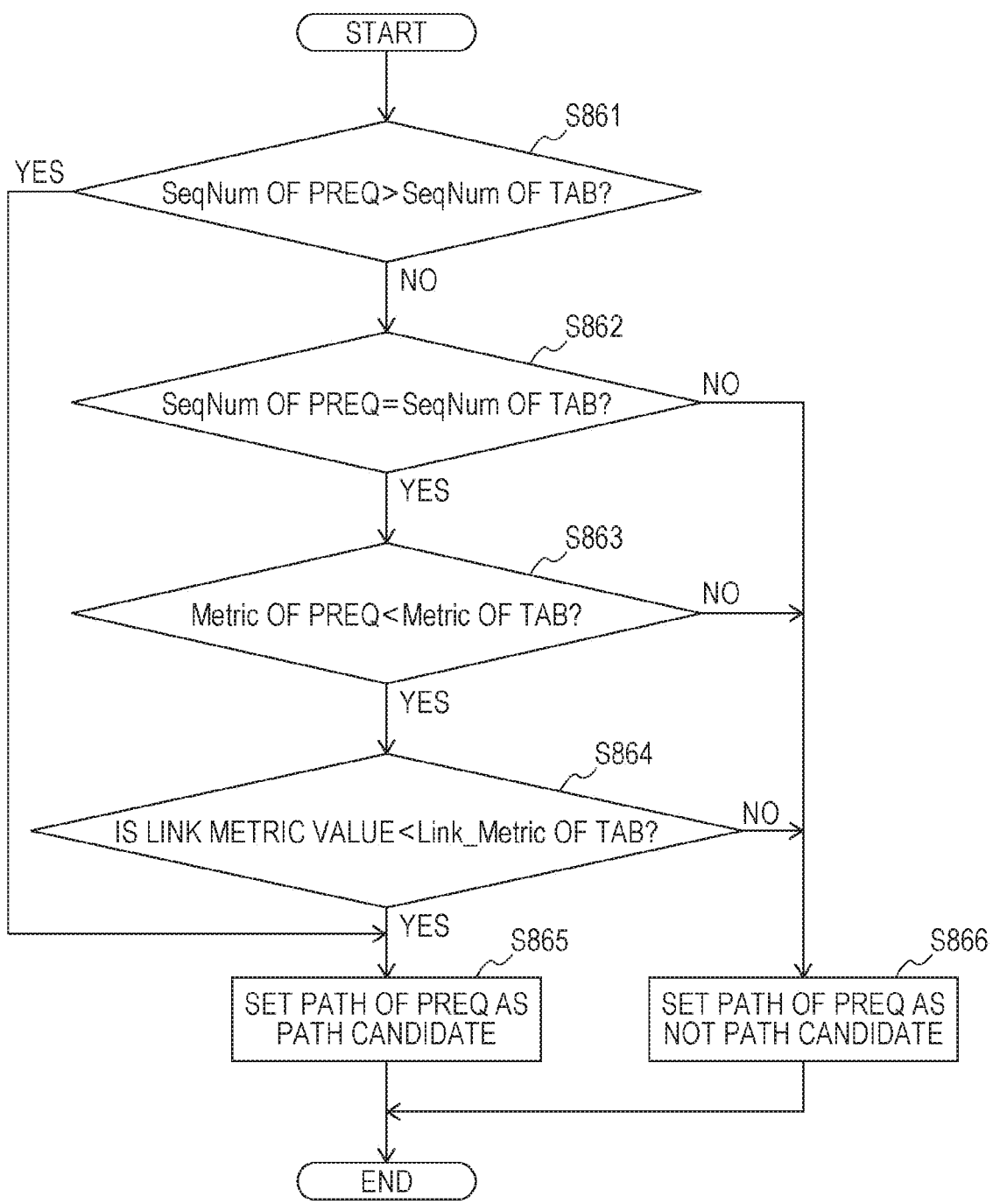
FIG. 21 is a flowchart that illustrates an example of the processing sequence of a multicast path candidate determining process executed by the information processing apparatus 100 according to an embodiment of the present technology.

FIG. 21 is a flowchart that illustrates an example of the processing sequence of a multicast path candidate determining process executed by the information processing apparatus 100 according to an embodiment of the present technology. This processing sequence is a modification of the multicast path candidate determining process (step S827) illustrated in FIG. 18 and illustrates an example of a case where a determination criterion other than that of the multicast path candidate determining process illustrated in FIG. 18 is used. In FIG. 21, description will be presented by assuming a case where the information of the received signal PREQ and the values stored in the TAB are set similarly to those of the example illustrated in FIG. 18.

First, the control unit 140 of the information processing apparatus 100 determines whether or not the value of SeqNum 235 (illustrated in FIG. 5B) of the received signal PREQ is larger than the value of SeqNum 254 (illustrated in FIGS. 11A and 11B) of the TAB (step S861). Then, in a case where the value of SeqNum 235 of the received signal PREQ is larger than the value of SeqNum 254 of the TAB (step S861), the control unit 140 determines the path of the signal PREQ as a path candidate (step S865).

On the other hand, in a case where the value of SeqNum 235 of the received signal PREQ is the value of SeqNum 254 of the TAB or less (step S861), the control unit 140 determines whether or not such values coincide with each other (step S862). In a case where such values do not coincide with each other (step S862), the control unit 140 determines that the path of the signal PREQ is not set as a path candidate (step S866).

On the other hand, in a case where such values coincide with each other (step S862), the control unit 140 determines whether or not the value stored in metric 237 (illustrated in FIG. 5B) of the received signal PREQ is smaller than the value stored in metric 253 (illustrated in FIGS. 11A and 11B) of the TAB (step S863). Then, in a case where the value stored in metric 237 of the received signal PREQ is the value stored in metric 253 of the TAB or more (step S863), the control unit 140 determines that the path of the signal PREQ is not set as a path candidate (step S866).

On the other hand, in a case where the value stored in metric 237 of the received signal PREQ is smaller than the value stored in metric 253 of the TAB (step S863), the control unit 140 makes a comparison of the link metric value (step S864). In other words, the control unit 140 determines whether or not the calculated link metric value (calculated in step S821 illustrated in FIG. 18) is smaller than the value stored in Link_metric 302 (illustrated in FIGS. 11A and 11B) of the TAB (step S864).

In a case where the calculated link metric value is the value stored in Link_metric 302 of the TAB or more (step S864), the control unit 140 determines that the path of the signal PREQ is not set as a path candidate (step S866).

On the other hand, in a case where the calculated link metric value is smaller than the value stored in Link_metric 302 of the TAB (step S864), the control unit 140 determines the path of the signal PREQ as a path candidate (step S865).

By determining as such, a mesh path candidate toward the employed root station can be determined not based on an accumulated value of the metric but based on the magnitude of a link metric that is necessary for adding the apparatus to the entire mesh path tree.

For example, in the example illustrated in FIGS. 12A, 12B, 12C and 12D and 13A and 13B, the information processing apparatus 102 receives the signal PREQ not only from the information processing apparatus 100 but also from the information processing apparatus 101. In such a case, as illustrated in FIG. 1, the metric value of the link to the information processing apparatus 101 is smaller than the metric value of the link to the information processing apparatus 100.

In such a case, in the example illustrated in FIG. 18, the information processing apparatus 102 sets the information processing apparatus 101 as a candidate for the path (Nexthop) toward the root station (the information processing apparatus 100) (step S828 illustrated in FIG. 18).

In this case, it is important to secure that the information processing apparatus 101 does not make the same determination (setting the information processing apparatus 102 as a path candidate toward the root station). For this reason, in the example illustrated in FIG. 21, a metric value (a metric value of a link denoted by a dotted line 104) stored in the signal PREQ transmitted by the information processing apparatus 101 is compared with a metric value of a link denoted by a dotted line 107. Then, a restriction on the execution of the determination only in a case where the metric value stored in the signal PREQ transmitted by the information processing apparatus 101 is smaller than the metric value of the candidate mesh path of the signal PREQ received from the information processing apparatus 100 is applied.

In this way, the control unit 140 may make the determination for transmitting the path request signal PREQ and the determination for maintaining the path information relating to the communication path specified by the path request signal as a path information candidate based on mutually-different criteria. In such a case, based on a result of the comparison between each metric value and each link metric value, the control unit 140 can make the determination for maintaining the path information candidate. For example, a metric value included in the path request signal, a link metric value of the path request signal for the transmission station, a metric value maintained as the path information candidate, and a link metric value for a neighboring station specified by the path information candidate are compared with each other. Then, based on a result of the comparison, the control unit 140 can execute the determination used for maintaining the path information candidate.

[Example of Generation of Multicast Mesh Path]

Here, an example is illustrated in which a multicast mesh path of a multicast address Addr-A is generated by the multicast path candidate determining process illustrated in FIG. 21.

Figure 22A:
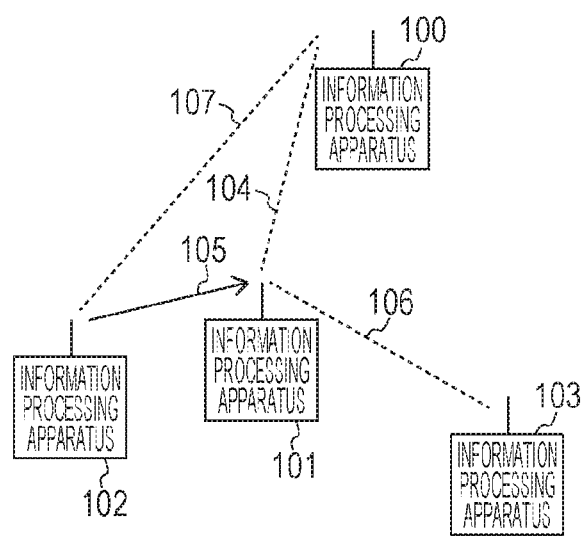
FIGS. 22A and 22B are diagrams that schematically illustrate an example of the generation of a multicast mesh path that is executed by each information processing apparatus configuring the communication system 10 according to an embodiment of the present technology.
Figure 22B:
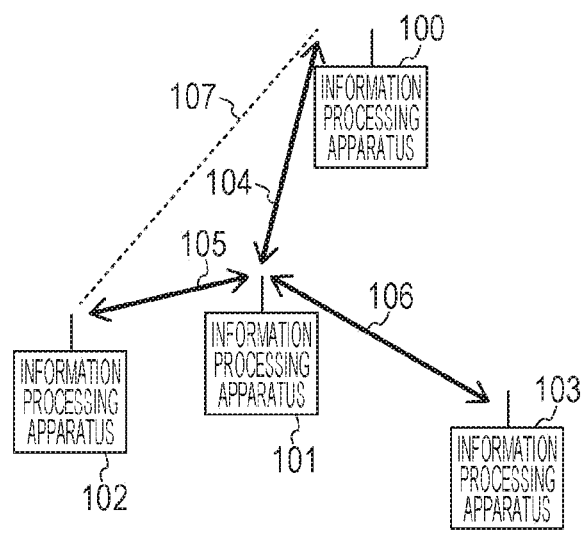

FIGS. 22A and 22B are diagrams that schematically illustrate an example of the generation of a multicast mesh path that is executed by each information processing apparatus configuring the communication system 10 according to an embodiment of the present technology.

FIGS. 23A and 23B and 24A and 24B are diagrams that schematically illustrate an example of a mesh path table generated by each information processing apparatus configuring the communication system 10 according to an embodiment of the present technology.

This generation example is partly common to that of FIGS. 12A, 12B, 12C and 12D and 13A and 13B and thus, will be described with reference to FIGS. 12 and 13. In addition, similarly to the example illustrated in FIGS. 12A, 12B, 12C and 12D and 13A and 13B, in the topology illustrated in FIG. 1, an example of a case where the information processing apparatus 100 is set as the root station, and the information processing apparatus 102 and the information processing apparatus 103 are set as member stations is illustrated. In addition, in the topology illustrated in FIG. 1, the metric value of each link (denoted by dotted lines 104 to 107) is assumed to be a value represented inside a rectangle on the dotted line. Furthermore, "D", "O", and "T" illustrated in each figure are similar to those of the example illustrated in FIGS. 12A, 12B, 12C and 12D and 13A and 13B.

First, as illustrated in FIGS. 12A and 12B, a proactive signal PREQ is transmitted. In other words, the information processing apparatus 100 regularly transmits the signal PREQ. In this signal PREQ, Addr-A is stored in Dest STA 234 (illustrated in FIG. 5B), "0" is stored in Orig STA 233 (illustrated in FIG. 5B), and "0" is stored in TX ADDR 223 (illustrated in FIG. 5B).

In addition, as illustrated in FIG. 12B, the information processing apparatus 101 that has received the signal PREQ executes a PREQ transmission process of transmitting the signal PREQ. In this transmitted signal PREQ, Addr-A is stored in Dest STA 234, "0" is stored in Orig STA 233, and "1" is stored in TX ADDR 223.

In addition, while the information processing apparatus 102 and the information processing apparatus 103 also execute the PREQ transmission process, here, it does not have any influence on the generation of a mesh path and thus, is not illustrated in the figure.

Subsequently, each information processing apparatus, as illustrated in FIG. 12D and FIG. 13A, similarly to the unicast mesh path generation process described above, transmits a response PREP to the received signal PREQ.

For example, the information processing apparatus 103 receives only one signal PREQ. For this reason, similarly to the example illustrated in FIG. 12D and FIG. 13A, the information processing apparatus 103 transmits the signal PREP to the information processing apparatus 100 through a relay station (the information processing apparatus 101). For this reason, as a part of the multicast mesh path of Addr-A, a link between the information processing apparatus 100 and the information processing apparatus 102 that passes through the information processing apparatus 101 is determined.

Here, in a case where the multicast path candidate determining process is used, the operation of the information processing apparatus 102 is different from that of the example illustrated in FIGS. 12A, 12B, 12C and 12D and 13A and 13B. In other words, the information processing apparatus 102 employs not a path of which the path metric is minimal but a path of which the link metric that is necessary for adding the information processing apparatus 102 to the entire mesh path tree is small. For this reason, as illustrated in FIG. 22A, the information processing apparatus 102 determines a path addressed to the information processing apparatus 100 as a path candidate, designates the information processing apparatus 101 as Nexthop, and transmits a signal PREP responding to the signal PREQ.

In this way, by exchanging the signals PREQ and PREP, a multicast mesh path is generated. In FIG. 22B, the generated multicast mesh path is denoted by thick-line arrows. As illustrated in FIG. 22B, frames having Addr-A as the destination can be transmitted/received among the information processing apparatus 100, the information processing apparatus 102, and the information processing apparatus 103.

An example of the mesh path table 300 generated in each information processing apparatus when the exchange of the signals PREQ and PREP illustrated in FIGS. 12A, 12B and 12D, FIG. 13A, and FIG. 22A is executed is illustrated in FIGS. 23A and 23B and 24A and 24B. More specifically, FIG. 23A illustrates a mesh path table generated in the information processing apparatus 100, and FIG. 23B illustrates a mesh path table generated in the information processing apparatus 101. In addition, FIG. 24A illustrates a mesh path table generated in the information processing apparatus 102, and FIG. 24B illustrates a mesh path table generated in the information processing apparatus 103.

[Example of Transmission of Packet Addressed to Multicast Address]

By executing each process described above, each information processing apparatus configuring the communication system 10 can determine a path through which a packet addressed to a multicast address is relayed. Then, each information processing apparatus can maintain the path information in the mesh path table 300.

In addition, in order to transmit a data packet addressed to a multicast address, each information processing apparatus can determine an information processing apparatus to be designated as the reception station for transmitting a packet by referring to the mesh path table 300. In other words, by referring to the mesh path table 300, an information processing apparatus to be designated in RX ADDR 222 (illustrated in FIG. 5A) for transmitting a packet can be determined. Thus, an example of the transmission of a packet addressed to a multicast address is illustrated in FIG. 25.

Figure 25:
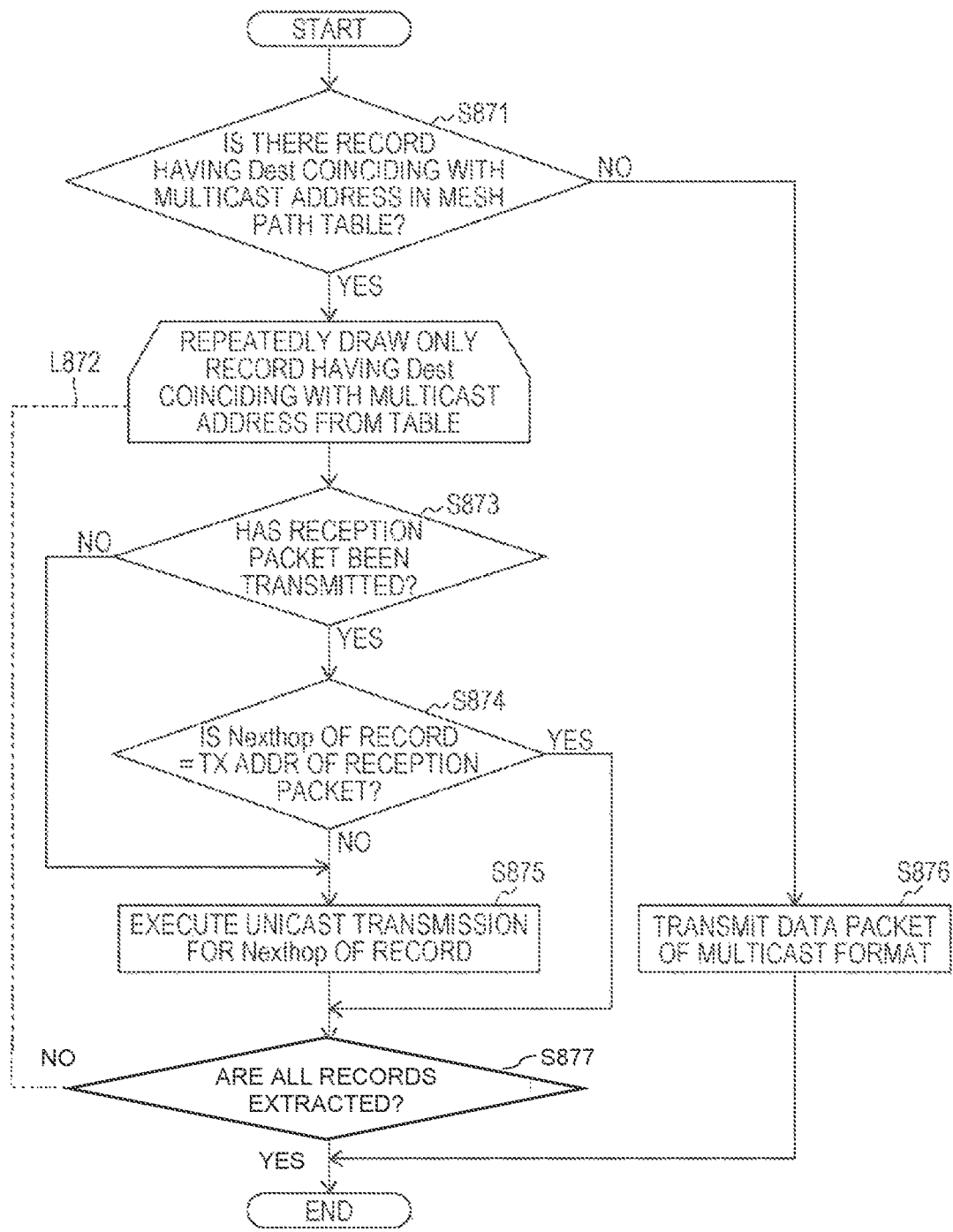
FIG. 25 is a flowchart that illustrates an example of the processing sequence of a transmission process of a packet addressed to a multicast address that is executed by the information processing apparatus 100 according to an embodiment of the present technology.

FIG. 25 is a flowchart that illustrates an example of the processing sequence of a transmission process of a packet addressed to a multicast address that is executed by the information processing apparatus 100 according to an embodiment of the present technology. In FIG. 25, a case will be described as an example in which the information processing apparatus 100 is an information processing apparatus that is the transmission source, and the information processing apparatus 100 transmits a packet addressed to a multicast address.

First, the control unit 140 of the information processing apparatus 100 determines whether or not there is a record of which Dest 251 (illustrated in FIGS. 11A and 11B) coincides with the multicast address by referring to the mesh path table 300 (step S871).

In a case where there is no matching record (step S871), the control unit 140 transmits the packet addressed to the multicast address with being loaded in a data packet format (illustrated in FIG. 3A) used for multicast (step S876).

On the other hand, in a case where there is a matching record (step S871), the control unit 140 transmits the packet addressed to the multicast address with being loaded in a data packet format (illustrated in FIG. 3B) used for unicast (Loop L872, steps S873 to S875). In this case, the control unit 140 stores the multicast address in Dst ADDR 214 (illustrated in FIG. 3B).

Here, in a case where a record of the mesh path table 300 is extracted for the purpose of referring to the path information at the time of transmission of a data packet, the record can be extracted by using a destination address as the key. In addition, in a case where there are a plurality of records having the destination address as the destination, all the records can be extracted (Loop L872). Then, unicast transmission is executed for a neighboring information processing apparatus designated by Nexthop 252 (illustrated in FIGS. 11A and 11B) of each record (step S875).

In a case where a reception packet is transmitted, similarly, in a case where the reception packet is received in the data packet format used for unicast, the mesh path table 300 is referred to by using the multicast address stored in Dst ADDR 214 as the key (Loop L872).

In such a case, the control unit 140 executes unicast transmission for an information processing apparatus designated by Nexthop 252 of each record that has been extracted (step S875). However, when the reception packet is transmitted (step S873), the transmission source of the packet is excluded from the transmission target (step S874).

In this way, in a case where a content is transmitted to a plurality of information processing apparatuses through multicast, the control unit 140 transmits the content to a neighboring information processing apparatus specified by the path information (a record of the mesh path table) through unicast.

[Example of Reception of Packet Addressed to Multicast Address]

Next, an example of a case where a packet addressed to a multicast address is received will be described.

For example, in a case where a packet of "Dst ADDR=multicast address" is received, the control unit 140 of the information processing apparatus 100 checks whether or not a frame storing the same content has already been received. In this case, recent multicast cache (RMC) checking, which is a duplicate packet reception checking process, executed at the time of reception of an ordinary multicast packet can be reused.

In a case where there is a sign of recent reception of a frame of the same pair (in other words, in a case where the frame is stored in the RMC) by referring to Src ADDR and the mesh sequence number of the packet, the received frame is discarded. By executing this process, a duplicate packet is not delivered to the upper layer.

In addition, when a packet (a packet of which DST ADDR is set to Addr-A) addressed to Addr-A is received, the information processing apparatus 100 checks whether or not the apparatus participates in the multicast group of Addr-A. Then, in a case where the apparatus participates in the multicast group of Addr-A, the information processing apparatus 100 sets the packet as a target to be exchanged with the upper layer. On the other hand, in a case where the apparatus does not participate in the multicast group of Addr-A, the packet is not exchanged with the upper layer.

In this way, according to the embodiment of the present technology, when multicast transmission (delivery) is executed within a mesh network, a mesh path used for multicast can be generated with a minimal overhead. In addition, robust transmission additionally using the ARQ can be executed. Furthermore, transmission of an unnecessary packet can be avoided, and accordingly, efficient transmission can be executed.

In other words, in the embodiment of the present technology, robust multicast transmission can be executed in a mesh network. In addition, by using a multicast mesh path, robust transmission additionally using the ARQ can be executed. In other words, robust transmission additionally using the ARQ using the unicast packet format from the information processing apparatus that is the transmission source of a data packet to each information processing apparatus belonging to the multicast group within the mesh network can be executed. Furthermore, efficient multi-hop relay is executed, and information of the multicast can be transmitted also to information processing apparatuses at which electric waves do not directly arrive.

2. Application Example

The technology according to an embodiment of the present disclosure is applicable to various products. For example, the information processing apparatuses 100 to 103 may be realized as a mobile terminal such as a smartphone, a tablet personal computer (PC), a notebook PC, a mobile gaming terminal, or a digital camera, a fixed terminal such as a television set, a printer, a digital scanner, or a network storage, or an in-vehicle terminal such as a car navigation apparatus. In addition, the information processing apparatuses 100 to 103 may be realized as a terminal (also referred to as a machine type communication (MTC) terminal) that executes machine to machine (M2M) communication such as a smart meter, an automatic vending machine, a remote monitoring apparatus or a point of sale (POS) terminal. Furthermore, the information processing apparatuses 100 to 103 may be a radio communication module (for example, an integrated circuit module configured by one die) mounted on each of the terminals.

2-1. First Application Example

Figure 26:
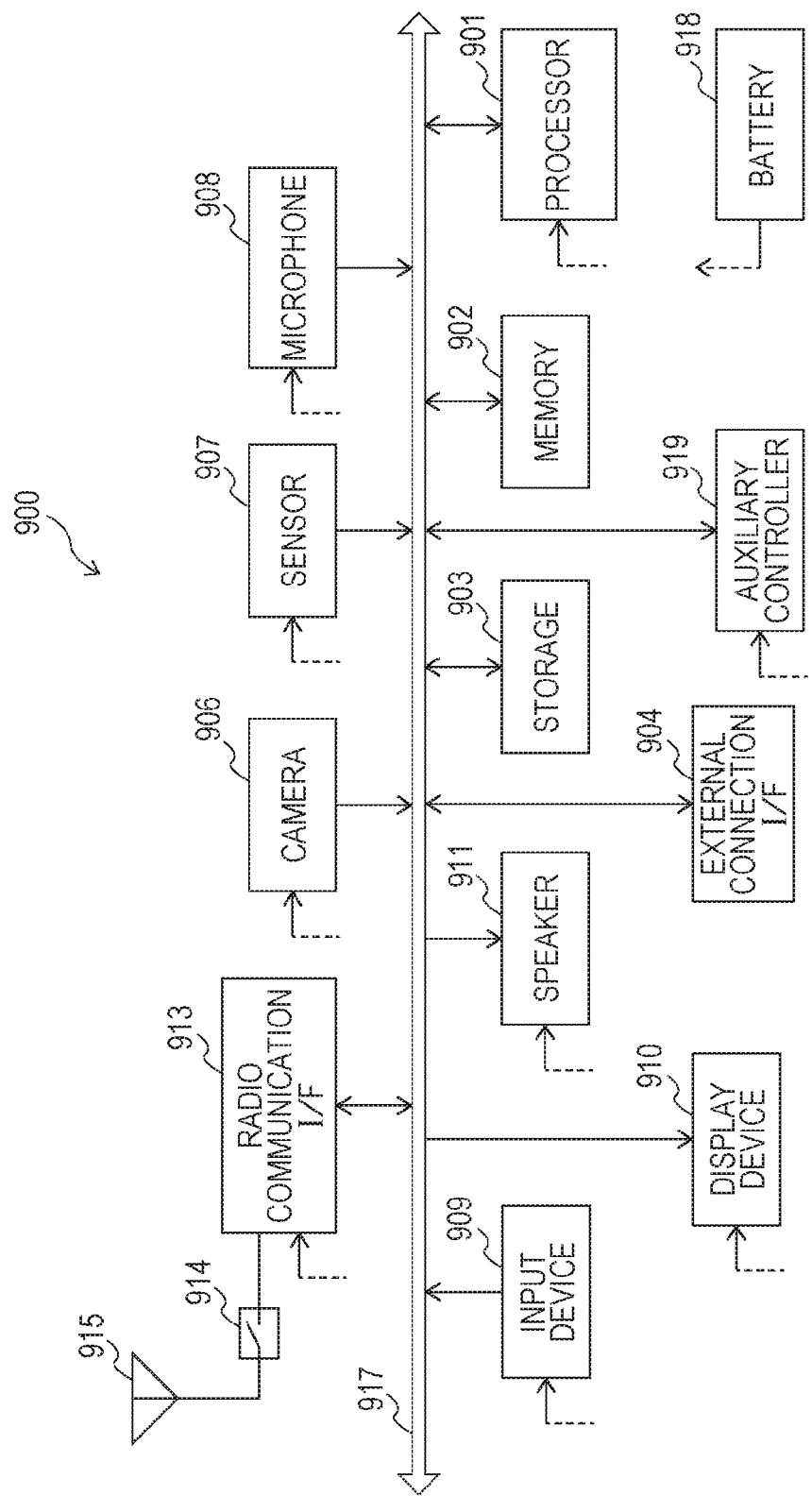
FIG. 26 is a block diagram that illustrates an example of the schematic configuration of a smartphone.

FIG. 26 is a block diagram that illustrates an example of the schematic configuration of a smartphone 900 to which the technology relating to the present disclosure is applied. The smartphone 900 includes: a processor 901; a memory 902; a storage 903; an external connection interface 904; a camera 906; a sensor 907; a microphone 908; an input device 909; a display device 910; a speaker 911; a radio communication interface 913; an antenna switch 914; an antenna 915; a bus 917; a battery 918; and an auxiliary controller 919.

The processor 901, for example, may be a central processing unit (CPU) or a system on chip (SoC) and controls the functions of an application layer and the other layers of the smartphone 900. The memory 902 includes a random access memory (RAM) and a read only memory (ROM) and stores programs executed by the processor 901 and data. The storage 903 may include a storage medium such as a semiconductor memory or a hard disk. The external connection interface 904 is an interface that is used for connecting an externally-attached device such as a memory card or a universal serial bus (USB) device to the smartphone 900.

The camera 906, for example, includes imaging devices such as charge coupled devices (CCD) or complementary metal oxide semiconductors (CMOS) and generates a captured image. The sensor 907, for example, may include a sensor group of a positioning sensor, a gyro sensor, a geomagnetic sensor, an acceleration sensor, and the like. The microphone 908 converts speech input to the smartphone 900 into an audio signal. The input device 909, for example, includes a touch sensor detecting a touch on a screen of the display device 910, a keypad, a keyboard, a button, a switch, or the like and receives an operation or an information input from the user. The display device 910 includes a screen of a liquid crystal display (LCD), an organic light emitting diode (OLED) display, or the like and displays an output image of the smartphone 900. The speaker 911 converts an audio signal output from the smartphone 900 into speech.

The radio communication interface 913 supports one or more wireless LAN standards such as IEEE802.11a, 11b, 11g, 11n, 11ac, and 11ad and executes radio communication. The radio communication interface 913 can communicate with the other apparatuses through a wireless LAN access point in an infrastructure mode. In addition, in a direct communication mode such as an ad hoc mode or a Wi-Fi direct mode, the radio communication interface 913 can directly communicate with other apparatuses. In the Wi-Fi Direct mode, while one of two terminals operates as an access point, differently from the ad hoc mode, the communication process is directly executed between the terminals. The radio communication interface 913, typically, may include; a baseband processor; a radio frequency (RF) circuit, a power amplifier, and the like. The radio communication interface 913 may be a one-chip module in which a memory storing a communication control program, a processor executing the program, and related circuits are integrated. The radio communication interface 913 may support a radio communication system of a different type such as a near field radio communication system, a proximity wireless communication system, or a cellular communication system in addition to the wireless LAN system. The antenna switch 914 switches a connection destination of the antenna 915 among a plurality of circuits (for example, circuits for mutually-different radio communication systems) included in the radio communication interface 913. The antenna 915 includes one or a plurality of antenna devices (for example, a plurality of antenna devices configuring a MIMO antenna) and is used for transmitting and receiving a radio signal through the radio communication interface 913.

In addition, the smartphone 900 is not limited to the example illustrated in FIG. 26 but may include a plurality of antennas (for example, an antenna used for wireless LAN, an antenna used for the proximity wireless communication system, and the like). In such a case, the antenna switch 914 may be omitted from the configuration of the smartphone 900.

The bus 917 interconnects: the processor 901; the memory 902; the storage 903; the external connection interface 904; the camera 906; the sensor 907; the microphone 908; the input device 909; the display device 910; the speaker 911; the radio communication interface 913; and the auxiliary controller 919. The battery 918 supplies power to each block of the smartphone 900 illustrated in FIG. 26 through a feed line that is partially illustrated using a broken line in the figure. The auxiliary controller 919, for example, in a sleep mode, operates minimum necessary functions of the smartphone 900.

In the smartphone 900 illustrated in FIG. 26, the control unit 140 described with reference to FIG. 2 may be mounted in the radio communication interface 913. In addition, at least some of the functions may be mounted in the processor 901 or the auxiliary controller 919.

In addition, the smartphone 900 may operate as a radio access point (software AP) as the processor 901 executes an access point function in an application level. Furthermore, the radio communication interface 913 may have the radio access point function.

2-2. Second Application Example

Figure 27:
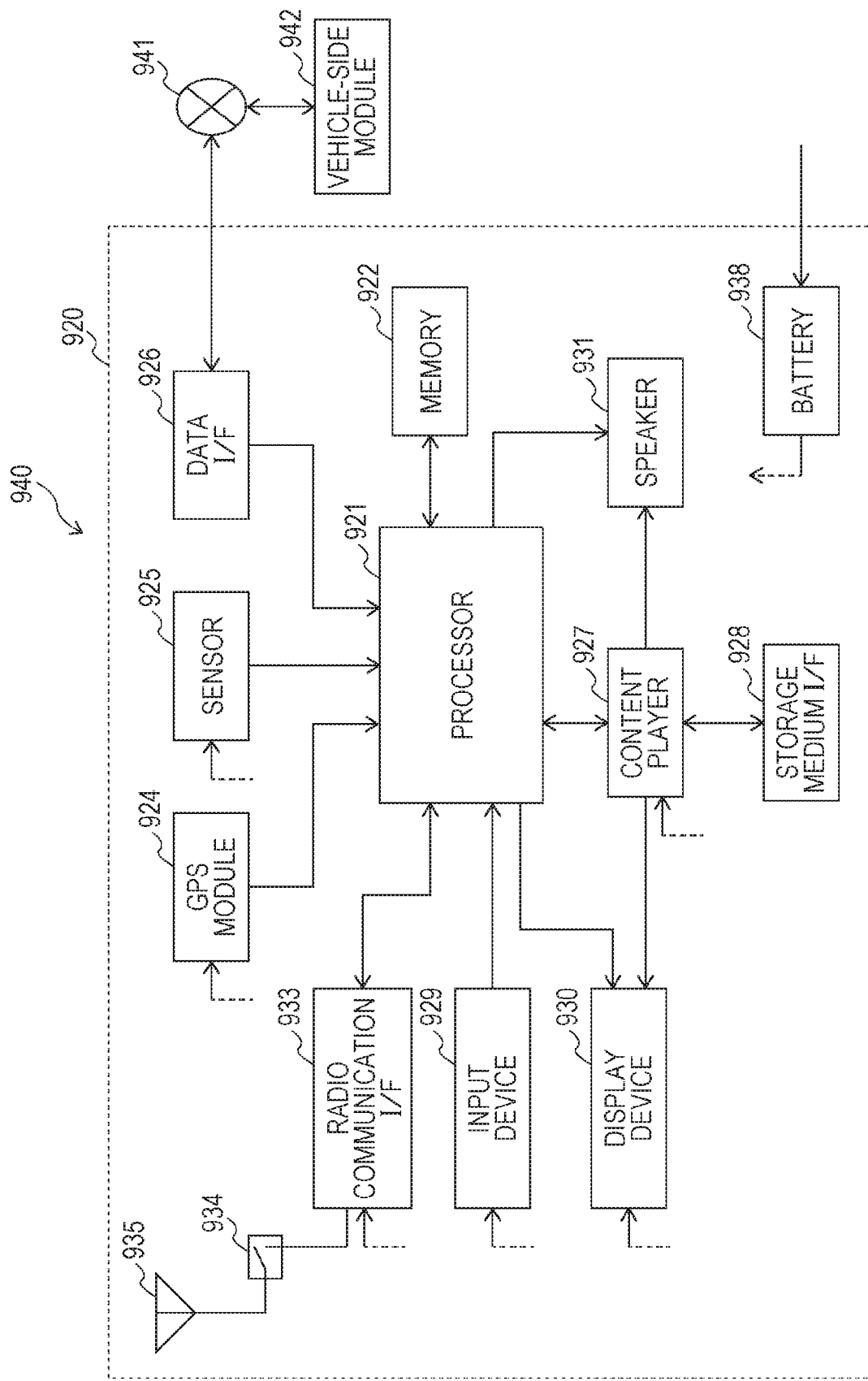
FIG. 27 is a block diagram that illustrates an example of the schematic configuration of a car navigation apparatus.

FIG. 27 is a block diagram that illustrates an example of the schematic configuration of a car navigation apparatus 920 to which the technology relating to the present disclosure is applied. The car navigation apparatus 920 includes: a processor 921; a memory 922; a global positioning system (GPS) module 924; a sensor 925; a data interface 926; a content player 927; a storage medium interface 928; an input device 929; a display device 930; a speaker 931; a radio communication interface 933; an antenna switch 934; an antenna 935; and a battery 938.

The processor 921, for example, is a CPU or a SoC and controls the navigation function and the other functions of the car navigation apparatus 920. The memory 922 includes a RAM and a ROM and stores programs executed by the processor 921 and data.

The GPS module 924 measures the position (for example, the longitude, the latitude, and the altitude) of the car navigation apparatus 920 by using GPS signals received from GPS satellites. The sensor 925, for example, may include a sensor group of a gyro sensor, a geo magnetic sensor, an atmosphere pressure sensor, and the like. The data interface 926, for example, is connected to an in-vehicle network 941 through a terminal not illustrated in the figure and acquires data such as vehicle speed data that is generated on the vehicle side.

The content player 927 reproduces a content stored on a storage medium (for example, a CD or a DVD) inserted in the storage medium interface 928. The input device 929, for example, includes a touch sensor detecting a touch on the screen of the display device 930, a button, a switch, or the like and receives an operation or an information input from the user. The display device 930 includes the screen of an LCD, an OLED display, or the like and displays an image of the navigation function or a reproduced content. The speaker 931 outputs an audio of the navigation function or the reproduced content.

The radio communication interface 933 supports one or more wireless LAN standards such as IEEE802.11a, 11b, 11g, 11n, 11ac, and 11ad and executes radio communication. The radio communication interface 933 can communicate with the other apparatuses through a wireless LAN access point in an infrastructure mode. In addition, in a direct communication mode such as an ad hoc mode or a Wi-Fi direct mode, the radio communication interface 933 can directly communicate with other apparatuses. The radio communication interface 933, typically, may include; a baseband processor; an RF circuit, a power amplifier, and the like. The radio communication interface 933 may be a one-chip module in which a memory storing a communication control program, a processor executing the program, and related circuits are integrated. The radio communication interface 933 may support a radio communication system of a different type such as a near field radio communication system, a proximity wireless communication system, or a cellular communication system in addition to the wireless LAN system. The antenna switch 934 switches a connection destination of the antenna 935 among a plurality of circuits included in the radio communication interface 933. The antenna 935 includes one or a plurality of antenna devices and is used for transmitting and receiving a radio signal through the radio communication interface 933.

In addition, the car navigation apparatus 920 is not limited to the example illustrated in FIG. 27 but may include a plurality of antennas. In such a case, the antenna switch 934 may be omitted from the configuration of the car navigation apparatus 920.

The battery 938 supplies power to each block of the car navigation apparatus 920 illustrated in FIG. 27 through a feed line that is partially illustrated using a broken line in the figure. The battery 938 accumulates power supplied from the vehicle side.

In the car navigation apparatus 920 illustrated in FIG. 27, the control unit 140 described with reference to FIG. 2 may be mounted in the radio communication interface 933. In addition, at least some of the functions may be mounted in the processor 921.

In addition, the technology relating to the present disclosure may be realized as an in-vehicle system (or a vehicle) 940 that includes one or more blocks of the car navigation apparatus 920 described above, the in-vehicle network 941, and a vehicle-side module 942. The vehicle-side module 942 generates vehicle-side data such as vehicle speed, engine revolution speed, or malfunction information and outputs the generated data to the in-vehicle network 941.

The embodiment described above illustrates an example for implementing the present technology, and an item of the embodiment and a specified item of claims have a correspondence relation. Similarly, a specified item of the claims and an item of the embodiment of the present technology, to which the same name is assigned, have a correspondence relation. However, the present technology is not limited to the embodiment but may be realized by applying various changes to the embodiment in a range not departing from the concept thereof.

In addition, the processing sequence described in the above-described embodiment may be perceived as a method having such a series of the sequence and may be perceived as a program causing a computer to execute such a series of the sequence or a recording medium storing the program. As the recording medium, for example, a compact disc (CD), a MiniDisc (MD), a digital versatile disc (DVD), a memory card, a Blu-ray (registered trademark) disc, or the like can be used.

The advantages described here are merely examples, and the advantages are not limited thereto, but other advantages may be acquired.

The present technology may take the following configurations as well.

(1)

An information processing apparatus in a mesh network, comprising: circuitry configured to when the information processing apparatus is allocated as a root node for multicast transmission: transmit a path request for multicast to other information processing apparatuses in the mesh network;
    determine a path for multicast based on responses received from the other information processing apparatuses; and perform multicast transmission of data via the determined path for multicast.

(2)

The information processing apparatus of (1), wherein when the information processing apparatus is allocated as a member node for multicast transmission, the circuitry is further configured to: determine information for a multicast path candidate in response to a request from another information processing apparatus in the mesh network; and transmit the information for the multicast path candidate to the other information processing apparatus in response to the request.

(3)
The information processing apparatus of (2), wherein when the information processing apparatus is allocated as a member node for multicast transmission, the circuitry is further configured to forward the path request for multicast to a further information processing apparatus and receive a response from the further information processing apparatus.

(4)
The information processing apparatus of (3), when the information processing apparatus is allocated as a member node for multicast transmission, the circuitry is further configured to increment a hop count in the path request for multicast before forwarding the path request multicast to the further information processing apparatus.

(5)
The information processing apparatus of any one of (1) to (4), wherein when the information processing apparatus is allocated as the root node for multicast transmission, the circuitry is further configured to determine the path for multicast based on path metric values included in the responses received from the other information processing apparatuses.

(6)
The information processing apparatus of any one of (1) to (5), wherein when the information processing apparatus is not allocated as the root node or a member node for multicast transmission, the circuitry is configured to:
determine information for a multicast path candidate in response to a request from another information processing apparatus in the mesh network; and transmit the information for the multicast path candidate to the other information processing apparatus in response to the request.

(7)
The information processing apparatus of (3) or (4), wherein the circuitry is further configured to forward the path request for multicast to the further information processing apparatus using unicast transmission.

(8)
The information processing apparatus of any one of (1) to (7), wherein when the information processing apparatus is allocated as the root node for multicast transmission, the circuitry is further configured to generate a multicast path table based on the responses received from the other information processing apparatuses.

(9)
The information processing apparatus of (8), wherein the circuitry is further configured to update the multicast path table periodically.

(10)
The information processing apparatus of (9), wherein the circuitry is further configured to update the multicast path table by transmitting another path request for multicast to the other information processing apparatuses.

(11)
The information processing apparatus of any one of (8) to (10), wherein the root node and each member node of a multicast transmission maintain a multicast path table.

(12)
The information processing apparatus of any one of (1) to (11), wherein when the information processing apparatus is allocated as a root node for multicast transmission, the circuitry is further configured to select a multicast transmission path based on path metrics included in the responses.

(13)
The information processing apparatus of (12), wherein determination of whether the information processing apparatus is allocated as the root node for the multicast transmission is made based on the path metrics included in the responses.

(14)
The information processing apparatus of (12) or (13), wherein the path metrics include a link metric representing a cost of adding the information processing apparatus to the path for multicast.

(15)
The information processing apparatus of (14), wherein the information processing apparatus is allocated as the root node when the link path metric indicates a lowest cost of adding the information processing apparatus to the path for multicast with respect to costs of adding the other information processing apparatuses to the path for multicast.

(16)
The information processing apparatus of (14) or (15), wherein the information processing apparatus communicates with the other information processing apparatuses over a wireless local area network connection.

(17)
An information processing method for an information processing apparatus in a mesh network, comprising: when the information processing apparatus is allocated as a root node for multicast transmission: transmitting, with circuitry, a path request for multicast to other information processing apparatuses in the mesh network;
determining, with the circuitry, a path for multicast based on responses received from the other information processing apparatuses; and performing, with the circuitry, multicast transmission of data via the determined path for multicast.

(18)
The information processing method of (17), wherein when the information processing apparatus is allocated as a member node for multicast transmission, the method further comprises: determining information for a multicast path candidate in response to a request from another information processing apparatus in the mesh network; and transmitting the information for the multicast path candidate to the other information processing apparatus in response to the request.

(19)
A non-transitory computer-readable medium encoded with computer-readable instructions thereon that, when executed by an information processing apparatus in a mesh network, cause the information processing apparatus to perform a method comprising:
when the information processing apparatus is allocated as a root node for multicast transmission: transmitting a path request for multicast to other information processing apparatuses in the mesh network; determining a path for multicast based on responses received from the other information processing apparatuses; and performing multicast transmission of data via the determined path for multicast.

(20)
The non-transitory computer-readable medium of (19), further comprising: when the information processing apparatus is allocated as a member node for multicast transmission: determining information for a multicast path candidate in response to a request from another information processing apparatus in the mesh network; and transmitting the information for the multicast path candidate to the other information processing apparatus in response to the request.

REFERENCE SIGNS LIST

10 Communication system
100 to 103 Information processing apparatus
110 Antenna
120 Communication unit
130 I/O interface
140 Control unit
150 Memory
160 Bus
171 Movement detecting unit
172 Operation reception unit
173 Display unit
174 Audio output unit
250 Mesh path table
300 Mesh path table
900 Smartphone
901 Processor
902 Memory
903 Storage
904 External connection interface
906 Camera
907 Sensor
908 Microphone
909 Input device
910 Display device
911 Speaker
913 Radio communication interface
914 Antenna switch
915 Antenna
917 Bus
918 Battery
919 Auxiliary controller
920 Car navigation apparatus
921 Processor
922 Memory
924 GPS module
925 Sensor
926 Data interface
927 Content player
928 Storage medium interface
929 Input device
930 Display device
931 Speaker
933 Radio communication interface
934 Antenna switch
935 Antenna
938 Battery
941 In-vehicle network
942 Vehicle-side module

The invention claimed is:

1. A first information processing apparatus of a plurality of information processing apparatuses in a mesh network, the first information processing apparatus comprising:
   circuitry configured to:
   based on a first allocation of the first information processing apparatus as a root node for multicast transmission,
      obtain movement information of the first information processing apparatus, wherein the movement information is associated with movement of the first information processing apparatus;
      transmit a first path request for multicast to remaining information processing apparatuses of the plurality of information processing apparatuses in the mesh network, wherein the first path request is transmitted based on the obtained movement information;
      receive a plurality of responses from the remaining information processing apparatuses, wherein the plurality of responses includes a plurality of path metric values;
      determine a path for the multicast based on the plurality of path metric values, wherein a link metric value of each of the plurality of path metric values indicates a transmission speed associated with a link of a plurality of links; and
      perform the multicast transmission of data based on the determined path for the multicast; and
   based on a second allocation of the first information processing apparatus as a member node of a plurality of member nodes for the multicast transmission,
      determine information for a multicast path candidate based on a second path request from a second information processing apparatus of the plurality of information processing apparatuses in the mesh network;
      transmit the information for the multicast path candidate to the second information processing apparatus based on the second path request;
      forward the second path request for the multicast to a third information processing apparatus of the plurality of information processing apparatuses;
      receive a response from the third information processing apparatus, wherein the plurality of responses includes the response received from the third information processing apparatus; and
      increment a hop count in the second path request for the multicast before the second path request for the multicast is forwarded to the third information processing apparatus.

2. The first information processing apparatus according to claim 1, wherein
based on the first information processing apparatus not allocated as one of the root node or the member node for the multicast transmission, the circuitry is further configured to:
   determine the information for the multicast path candidate based on the second path request from the second information processing apparatus in the mesh network; and
   transmit the information for the multicast path candidate to the second information processing apparatus based on the second path request.

3. The first information processing apparatus according to claim 1, wherein the circuitry is further configured to forward the second path request for the multicast to the third information processing apparatus based on unicast transmission.

4. The first information processing apparatus according to claim 1, wherein
based on the first allocation of the first information processing apparatus as the root node for the multicast transmission, the circuitry is further configured to generate a multicast path table based on the received plurality of response.

5. The first information processing apparatus according to claim 4, wherein the circuitry is further configured to update the multicast path table periodically.

6. The first information processing apparatus according to claim 5, wherein the circuitry is further configured to update the multicast path table based on transmission of a third path request for the multicast to the remaining information processing apparatuses.

7. The first information processing apparatus according to claim 4, wherein the root node and each member node of the plurality of member nodes for the multicast transmission maintain the multicast path table.

8. The first information processing apparatus according to claim 1, wherein determination of the first allocation of the first information processing apparatus as the root node for the multicast transmission is based on the plurality of path metric values included in the plurality of responses.

9. The first information processing apparatus according to claim 8, wherein the link metric value of each of the plurality of path metric values further indicates a cost of addition of the first information processing apparatus to the path for the multicast.

10. The first information processing apparatus according to claim 9,
wherein the first allocation of the first information processing apparatus as the root node is based on the plurality of path metric values that indicate a lowest cost of addition of the first information processing apparatus to the path for the multicast with respect to costs of addition of the remaining information processing apparatuses to the path for the multicast.

11. The first information processing apparatus according to claim 1,
wherein the first information processing apparatus is further configured to communicate with the remaining information processing apparatuses over a wireless local area network connection.

12. An information processing method for a first information processing apparatus of a plurality of information processing apparatuses in a mesh network, the information processing method comprising:
based on a first allocation of the first information processing apparatus as a root node for multicast transmission:
obtaining, with circuitry, movement information of the first information processing apparatus, wherein the movement information is associated with movement of the first information processing apparatus;
transmitting, with the circuitry, a first path request for multicast to remaining information processing apparatuses of the plurality of information processing apparatuses in the mesh network, wherein the first path request is transmitted based on the obtained movement information;
receiving, with the circuitry, a plurality of responses from the remaining information processing apparatuses, wherein the plurality of responses includes a plurality of path metric values;
determining, with the circuitry, a path for the multicast based on the plurality of path metric values, wherein a link metric value of each of the plurality of path metric values indicates a transmission speed associated with a link of a plurality of links; and
performing, with the circuitry, the multicast transmission of data based on the determined path for the multicast; and
based on a second allocation of the first information processing apparatus as a member node for the multicast transmission:
determining, with the circuitry, information for a multicast path candidate based on a second path request from a second information processing apparatus of the plurality of information processing apparatuses in the mesh network;
transmitting, with the circuitry, the information for the multicast path candidate to the second information processing apparatus based on the second path request;
forwarding, with the circuitry, the second path request for the multicast to a third information processing apparatus of the plurality of information processing apparatuses;
receiving, with the circuitry, a response from the third information processing apparatus, wherein the plurality of responses includes the response received from the third information processing apparatus; and
incrementing, with the circuitry, a hop count in the second path request for the multicast before forwarding the second path request for the multicast to the third information processing apparatus.

13. A non-transitory computer-readable medium having stored thereon computer-executable instructions which, when executed by a first information processing apparatus of a plurality of information processing apparatuses in a mesh network, cause the first information processing apparatus to execute operations, the operations comprising:
based on a first allocation of the first information processing apparatus as a root node for multicast transmission:
obtaining movement information of the first information processing apparatus, wherein the movement information is associated with movement of the first information processing apparatus;
transmitting a first path request for multicast to remaining information processing apparatuses of the plurality of information processing apparatuses in the mesh network, wherein the first path request is transmitted based on the obtained movement information;
receiving a plurality of responses from the remaining information processing apparatuses, wherein the plurality of responses includes a plurality of path metric values;
determining a path for the multicast based on the plurality of path metric values, wherein a link metric value of each of the plurality of path metric values indicates a transmission speed associated with a link of a plurality of links; and
performing the multicast transmission of data based on the determined path for the multicast; and
based on a second allocation of the first information processing apparatus as a member node for the multicast transmission:
determining information for a multicast path candidate based on a second path request from a second information processing apparatus of the plurality of information processing apparatuses in the mesh network;
transmitting the information for the multicast path candidate to the second information processing apparatus based on the second path request;
forwarding the second path request for the multicast to a third information processing apparatus of the plurality of information processing apparatuses;
receiving a response from the third information processing apparatus, wherein the plurality of responses includes the response received from the third information processing apparatus; and incrementing a hop count in the second path request for the multicast before forwarding the second path request for the multicast to the third information processing apparatus.

* * * * *